US008452317B2

(12) United States Patent
Li et al.

(10) Patent No.: US 8,452,317 B2
(45) Date of Patent: May 28, 2013

(54) METHODS AND APPARATUS RELATED TO POWER CONTROL AND/OR INTERFERENCE MANAGEMENT IN A MIXED WIRELESS COMMUNICATIONS SYSTEM SUPPORTING WAN SIGNALING AND PEER TO PEER SIGNALING

(75) Inventors: Junyi Li, Bedminster, NJ (US); Rajiv Laroia, Far Hills, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1037 days.

(21) Appl. No.: 11/775,849

(22) Filed: Jul. 10, 2007

(65) Prior Publication Data
US 2008/0069039 A1    Mar. 20, 2008

Related U.S. Application Data

(63) Continuation-in-part of application No. 11/764,332, filed on Jun. 18, 2007.

(60) Provisional application No. 60/845,053, filed on Sep. 15, 2006.

(51) Int. Cl.
*H04B 7/185*    (2006.01)
*H04B 7/00*    (2006.01)

(52) U.S. Cl.
USPC ............ 455/522; 455/518; 455/519; 370/318

(58) Field of Classification Search
USPC .......................... 455/518, 519, 522; 370/318
See application file for complete search history.

(56) References Cited

U.S. PATENT DOCUMENTS

| 5,491,837 A | 2/1996 | Haartsen |
| 5,542,097 A | 7/1996 | Ward et al. |
| 5,903,618 A | 5/1999 | Miyake et al. |
| 6,167,270 A | 12/2000 | Rezaiifar et al. |

(Continued)

FOREIGN PATENT DOCUMENTS

| CN | 1386024 A | 12/2002 |
| EP | 1257140 | 11/2002 |

(Continued)

OTHER PUBLICATIONS

International Search Report—PCT/US07/078470, International Search Authority, European Patent Office—Mar. 26, 2008.

(Continued)

*Primary Examiner* — Bobbak Safaipour
(74) *Attorney, Agent, or Firm* — James K. O'Hare

(57) ABSTRACT

Methods and apparatus related to the sharing of wide area network (WAN) uplink bandwidth with peer to peer communication signaling usage are described. The base station regulates the level of interference from the peer to peer signaling by generating and transmitting peer to peer transmission power control signals intended for peer to peer wireless terminals in the local vicinity. A base station transmits into a downlink frequency band a signal, e.g., a beacon or broadcast channel signal, to be used by a peer to peer wireless terminal in controlling its peer to peer transmit power level into the corresponding uplink frequency band. The peer to peer wireless terminal receives and evaluates the base station signal. The determined information from the evaluation is used in determining whether or not peer to peer signal transmission is permitted and/or in determining a peer to peer transmission power level.

29 Claims, 24 Drawing Sheets

U.S. PATENT DOCUMENTS

| | | |
|---|---|---|
| 6,175,745 B1 | 1/2001 | Bringby et al. |
| 6,198,441 B1 | 3/2001 | Okabe et al. |
| 6,252,865 B1 | 6/2001 | Walton et al. |
| 6,377,608 B1 | 4/2002 | Zyren |
| 6,415,146 B1 | 7/2002 | Capece |
| 6,442,397 B1 | 8/2002 | Benveniste |
| 6,577,670 B1 | 6/2003 | Roberts |
| 6,580,704 B1 | 6/2003 | Wellig et al. |
| 6,594,251 B1 | 7/2003 | Raissinia et al. |
| 6,658,262 B1 | 12/2003 | Lundborg |
| 6,675,012 B2 | 1/2004 | Gray |
| 6,748,246 B1 | 6/2004 | Khullar |
| 6,754,484 B1 | 6/2004 | Hiltunen et al. |
| 6,763,013 B2 | 7/2004 | Kennedy |
| 6,775,548 B1 | 8/2004 | Rong et al. |
| 6,807,165 B2 | 10/2004 | Belcea |
| 6,823,003 B2 | 11/2004 | Laureanti |
| 6,823,195 B1 | 11/2004 | Boesen |
| 6,834,045 B1 | 12/2004 | Lappetelainen et al. |
| 6,836,663 B1 | 12/2004 | Kotzin |
| 6,842,433 B2 | 1/2005 | West et al. |
| 6,843,597 B1 | 1/2005 | Li et al. |
| 6,882,851 B2 | 4/2005 | Sugar et al. |
| 6,909,706 B2 | 6/2005 | Wilmer et al. |
| 6,914,894 B2 | 7/2005 | Wilmer et al. |
| 6,920,311 B2 | 7/2005 | Rofougaran et al. |
| 6,937,641 B2 | 8/2005 | Li et al. |
| 6,987,966 B1 | 1/2006 | Wu et al. |
| 7,003,283 B2 | 2/2006 | Hiltunen et al. |
| 7,006,799 B2 | 2/2006 | Wiemeyer et al. |
| 7,016,673 B2 | 3/2006 | Reddy et al. |
| 7,020,442 B2 | 3/2006 | Najafi et al. |
| 7,099,296 B2 | 8/2006 | Belcea |
| 7,133,391 B2 | 11/2006 | Belcea |
| 7,151,795 B1 | 12/2006 | Goldburg |
| 7,155,161 B2 * | 12/2006 | Regulinski et al. ........... 455/13.1 |
| 7,158,484 B1 | 1/2007 | Ahmed et al. |
| 7,181,178 B2 | 2/2007 | Chow |
| 7,203,472 B2 | 4/2007 | Seppinen et al. |
| 7,212,504 B2 | 5/2007 | Belcea |
| 7,386,043 B2 | 6/2008 | Goldburg |
| 7,447,174 B2 | 11/2008 | Joshi |
| 7,489,905 B2 | 2/2009 | Qi et al. |
| 7,492,743 B2 | 2/2009 | Uhlik |
| 7,508,778 B2 | 3/2009 | Yafuso |
| 7,567,791 B2 * | 7/2009 | Laroia et al. .............. 455/343.2 |
| 7,620,415 B2 | 11/2009 | Ashkenazi et al. |
| 7,634,234 B2 * | 12/2009 | Karabinis ................. 455/67.11 |
| 7,706,824 B2 | 4/2010 | Schulist et al. |
| 7,751,827 B2 | 7/2010 | Poykko et al. |
| 7,787,408 B2 | 8/2010 | Proctor, Jr. et al. |
| 7,953,417 B2 | 5/2011 | Laroia et al. |
| 7,974,633 B2 | 7/2011 | Kennedy et al. |
| 8,014,359 B2 | 9/2011 | Cave et al. |
| 8,060,129 B2 | 11/2011 | Grob et al. |
| 8,140,012 B1 | 3/2012 | Causey et al. |
| 2002/0065094 A1 | 5/2002 | Schmutz et al. |
| 2002/0173277 A1 | 11/2002 | Takao et al. |
| 2003/0053437 A1 | 3/2003 | Bahl et al. |
| 2003/0076168 A1 | 4/2003 | Forrester |
| 2003/0144003 A1 | 7/2003 | Ranta et al. |
| 2004/0023627 A1 | 2/2004 | Osaki et al. |
| 2004/0095902 A1 | 5/2004 | Laroia et al. |
| 2005/0013283 A1 | 1/2005 | Yoon et al. |
| 2005/0025315 A1 | 2/2005 | Kreitzer |
| 2005/0093624 A1 | 5/2005 | Forrester et al. |
| 2005/0111383 A1 * | 5/2005 | Grob et al. ..................... 370/254 |
| 2005/0143119 A1 | 6/2005 | Chandra et al. |
| 2005/0215196 A1 | 9/2005 | Krishnan et al. |
| 2005/0239451 A1 | 10/2005 | Periyalwar et al. |
| 2006/0023629 A1 | 2/2006 | Kim et al. |
| 2006/0148516 A1 | 7/2006 | Reddy et al. |
| 2006/0168343 A1 | 7/2006 | Ma et al. |
| 2006/0178148 A1 | 8/2006 | Du et al. |
| 2006/0229092 A1 | 10/2006 | Jia et al. |
| 2007/0011171 A1 | 1/2007 | Nurminen et al. |
| 2007/0077884 A1 * | 4/2007 | Regulinski et al. .......... 455/12.1 |
| 2007/0213087 A1 | 9/2007 | Laroia et al. |
| 2007/0233832 A1 * | 10/2007 | Narayanan et al. ........... 709/223 |
| 2007/0275696 A1 | 11/2007 | Cheng et al. |
| 2007/0286171 A1 | 12/2007 | Guan |
| 2008/0002658 A1 | 1/2008 | Soliman |
| 2008/0013497 A1 | 1/2008 | Belcea |
| 2008/0013500 A1 | 1/2008 | Laroia et al. |
| 2008/0019333 A1 | 1/2008 | Kharia et al. |
| 2008/0055068 A1 | 3/2008 | Van Wageningen et al. |
| 2008/0069033 A1 | 3/2008 | Li et al. |
| 2008/0069062 A1 | 3/2008 | Li et al. |
| 2008/0069063 A1 | 3/2008 | Li et al. |
| 2008/0318612 A1 * | 12/2008 | Axnas et al. .................. 455/522 |
| 2009/0221325 A1 | 9/2009 | Periyalwar et al. |
| 2011/0045864 A1 | 2/2011 | Chen et al. |
| 2011/0201374 A1 | 8/2011 | Periyalwar et al. |
| 2011/0230206 A1 | 9/2011 | Kennedy, Jr. et al. |

FOREIGN PATENT DOCUMENTS

| | | |
|---|---|---|
| EP | 1689207 | 8/2006 |
| JP | 9107583 | 4/1997 |
| JP | 2001358651 A | 12/2001 |
| JP | 2002112347 A | 4/2002 |
| JP | 2002290328 A | 10/2002 |
| JP | 2002325281 A | 11/2002 |
| JP | 2003087171 A | 3/2003 |
| JP | 2004023613 A | 1/2004 |
| JP | 2005236696 A | 9/2005 |
| JP | 2005260427 A | 9/2005 |
| JP | 2005341297 A | 12/2005 |
| JP | 2006501777 A | 1/2006 |
| JP | 2006191315 A | 7/2006 |
| JP | 2007512779 A | 5/2007 |
| JP | 2007527673 A | 9/2007 |
| JP | 2007531347 A | 11/2007 |
| JP | 2008517546 A | 5/2008 |
| KR | 1020060094101 A | 8/2006 |
| WO | WO 2004030392 A1 * | 4/2004 |
| WO | WO2005011163 A1 | 2/2005 |
| WO | 2005038606 | 4/2005 |
| WO | 2005053253 | 6/2005 |
| WO | WO2005088863 | 9/2005 |
| WO | 2006016331 | 2/2006 |
| WO | WO2006043136 A1 | 4/2006 |
| WO | 2006064411 | 6/2006 |
| WO | 2007055623 A1 | 5/2007 |
| WO | 2007082281 | 7/2007 |
| WO | 2008005922 | 1/2008 |

OTHER PUBLICATIONS

Written Opinion—PCT/US07/078470, International Search Authority, European Patent Office—Mar. 26, 2008.
International Search Report—PCT/US07/078435, International Search Authority, European Patent Office—Feb. 7, 2008.
Written Opinion—PCT/US07/078435, International Search Authority, European Patent Office—Feb. 7, 2008.
Stoica, I. et al.: "Chord: A Scalable Peer-to-peer Lookup Service for Internet Applications", SIGCOMM' 01, Aug. 27-31, 2001, San Diego, CA, USA, pp. 1-12.
Taiwan Search Report—TW096134644—TIPO—May 6, 2011.
Taiwan Search Report—TW096134620—TIP0—Jul. 22, 2011.
Ozeki, T., "Realization of Public Network and AD-HOC Network Hybrid System based on TDD-CDMA," IEICE Technical Report, The Institute of Electronics, Information and Communication Engineers, vol. 103, No. 415, pp. 59-64.

* cited by examiner

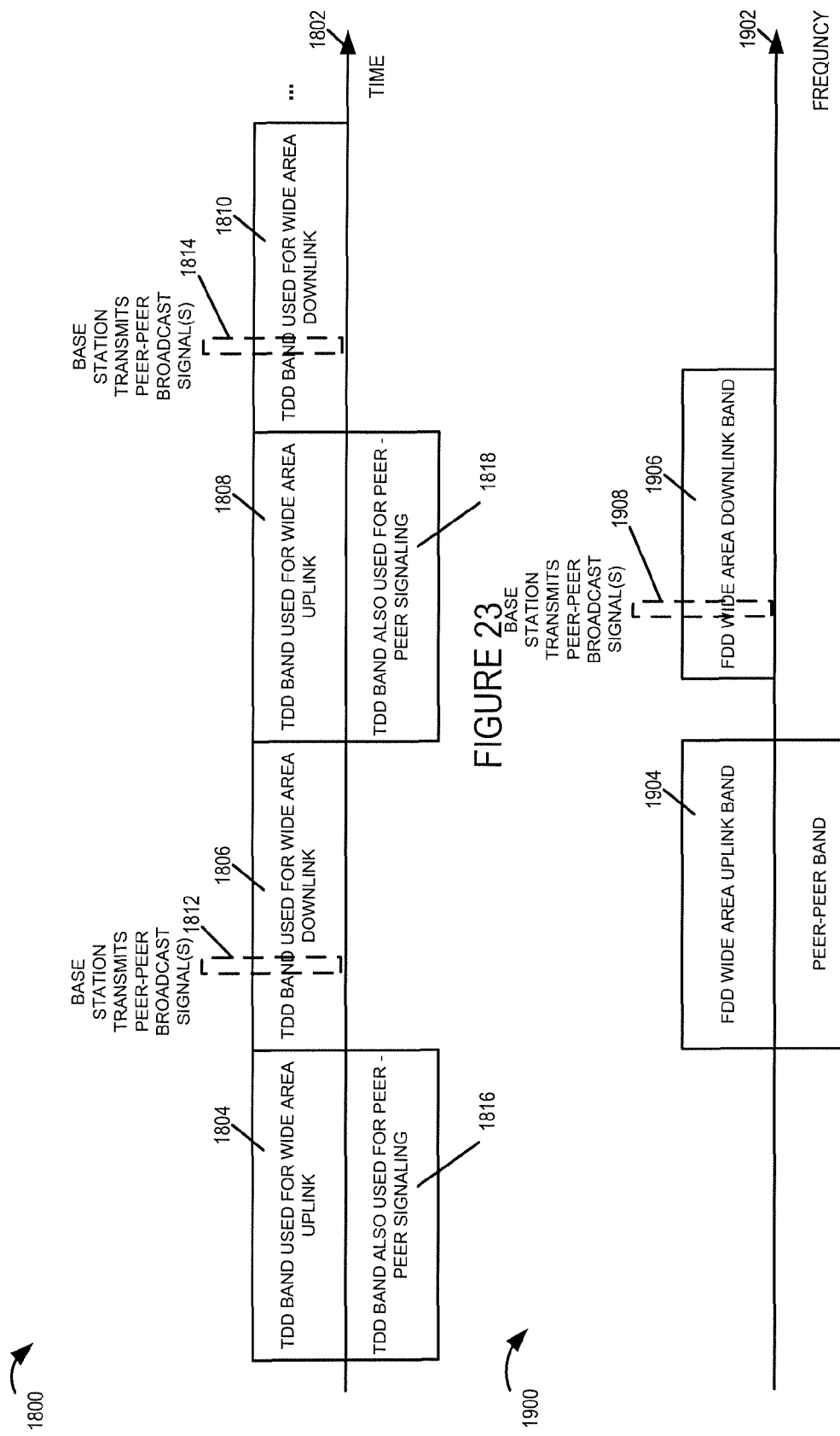

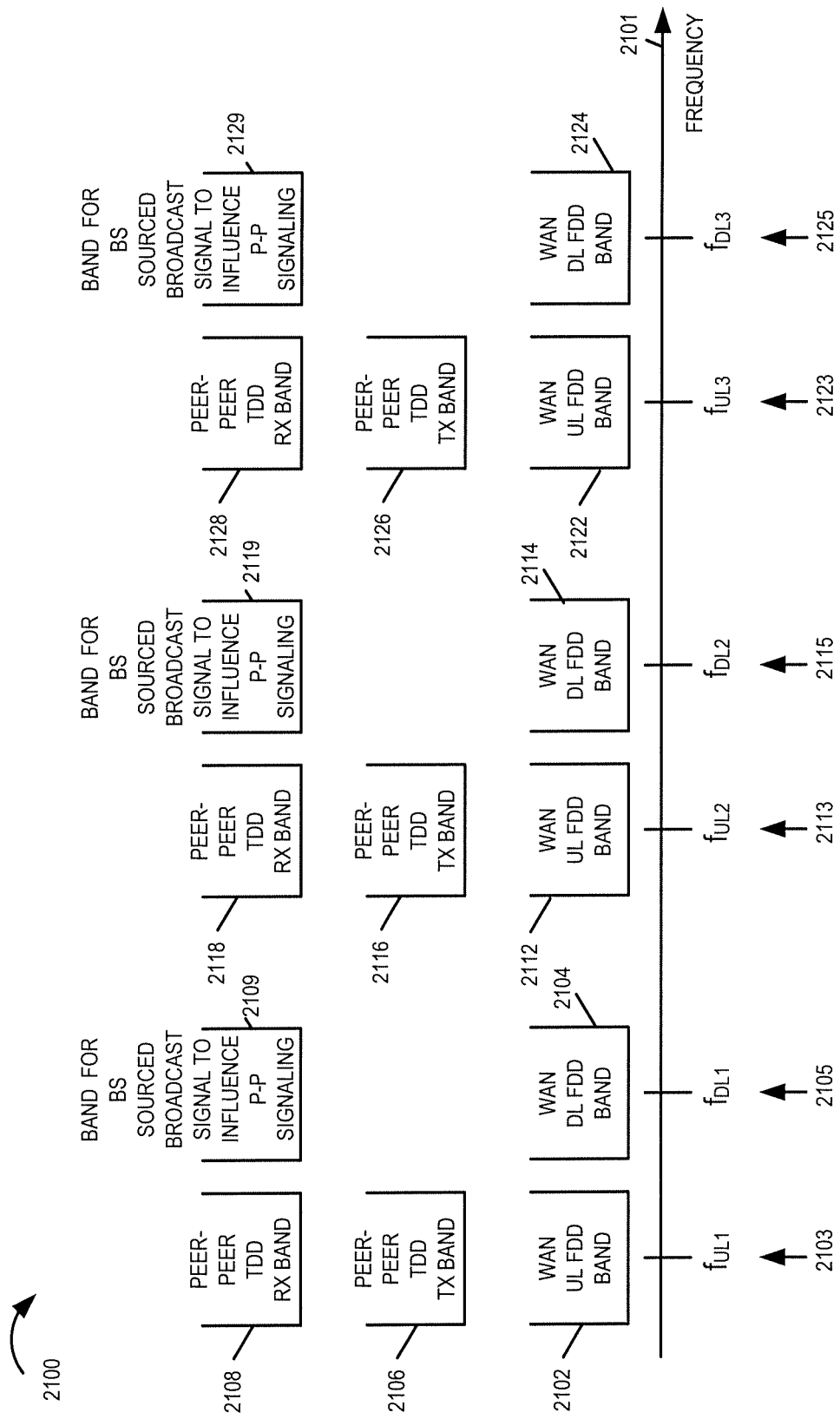

METHODS AND APPARATUS RELATED TO POWER CONTROL AND/OR INTERFERENCE MANAGEMENT IN A MIXED WIRELESS COMMUNICATIONS SYSTEM SUPPORTING WAN SIGNALING AND PEER TO PEER SIGNALING

RELATED APPLICATIONS

The present application claims the benefit of U.S. Provisional Patent Application Ser. No. 60/845,053 filed on Sep. 15, 2006, titled "BEACONS IN A MIXED WIRELESS COMMUNICATION SYSTEM" and is a continuation-in-part of U.S. patent application Ser. No. 11/764,332 filed Jun. 18, 2007 titled "METHODS AND APPARATUS RELATED TO PEER TO PEER DEVICE CONTROL" both of which are hereby expressly incorporated by reference and both of which are assigned to the assignee of the present application.

FIELD

Various embodiments are directed to methods and apparatus for wireless communications, and more particularly to methods and apparatus related to peer to peer communications.

BACKGROUND

Wireless spectrum is an expensive and valuable resource. In wide area network systems, e.g., cellular systems, wireless spectrum allocated to the WAN is, at times, less than fully utilized. It would be advantageous if methods and apparatus were developed which recognized and/or utilized such underutilized air link resources. It would be beneficial if such methods and apparatus were adaptive such that interference to the WAN communications generated from the additional usage of the air link resource could be managed. Methods and apparatus that share bandwidth between WAN communications and peer to peer communications while causing minimal disruption and/or modification to a WAN system would be beneficial.

SUMMARY

Methods and apparatus related to the sharing of wide area network (WAN) uplink bandwidth with peer to peer communication signaling usage are described. A base station transmits a signal into a base station downlink frequency band, e.g., a beacon signal or non-beacon broadcast channel signal serving as a reference and/or control information signal, to be used by a peer to peer wireless terminal in controlling its peer to peer transmit power level in a corresponding base station uplink frequency band. The peer to peer wireless terminal receives and evaluates the base station signal. The evaluation, e.g., a received signal power measurement and/or decoding operation, obtains information used by the peer to peer wireless terminal in determining whether or not peer to peer signal transmission is permitted and/or in determining a peer to peer transmission power level. In some embodiments, current service level information and/or other encoded information, e.g., an interference level indicator value, conveyed by the received base station signal are utilized by the peer to peer wireless terminal in determining a peer to peer transmission power level.

In various embodiments, the base station varies the transmission power level of a signal being transmitted and/or varies the information being communicated by the signal. In this way, the base station can dynamically regulate interference being generated by the peer to peer wireless terminals which is impacting its reception of WAN uplink signals.

Since the reference and/or control signal transmitted by the base station, which is intended for the peer to peer wireless terminals, is communicated in the base station's downlink frequency band, the base station can simply incorporate this signal into its downlink transmission structure. If such a signal had instead been designated to be transmitted in the base station's uplink band, the base station would need to restrict WAN uplink signaling from cellular communications devices during such a time interval since it is not practical for the base station to be transmitting and receiving in the same band concurrently due to interference considerations. Thus this approach of communicating the peer to peer reference/control signal in a base station downlink band is advantageous from the perspective of base station design considerations and/or impact to WAN uplink signaling.

An exemplary method of operating a wireless communications device supporting peer to peer communications in a base station uplink frequency band comprises: receiving a first signal from a base station in a downlink frequency band; performing an evaluation on the received signal; and controlling peer to peer transmission power for at least some peer to peer signal transmissions in said uplink frequency band as a function of the result of the evaluation of said first received signal. An exemplary wireless communications device supporting peer to peer communications in a base station uplink frequency band comprises: a receiver module for receiving a first signal from a base station in a downlink frequency band; a signal processing module for performing an evaluation on the received signal; and a peer to peer transmission power control module for controlling peer to peer transmission power for at least some peer to peer signal transmissions in said uplink frequency band as a function of the result of the evaluation of said first received signal.

An exemplary method of operating a base station to control interference from peer to peer communications in a first communications band comprises: generating a peer to peer transmission power control signal; and transmitting said peer to peer transmission power control signal in a second communications band, said second communications band being different from said first communications band. An exemplary base station which controls interference from peer to peer communications in a first communications band, the base station comprises: a peer to peer transmission power control signal generation module for generating a peer to peer transmission power control signal; and a transmitter module for transmitting said peer to peer transmission power control signal in a second communications band, said second communications band being different from said first communications band. In some embodiments the base station generates and transmits different distinct control signals to control power transmission levels for wide area network uplink transmission power control and for peer to peer transmission power control.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

BRIEF DESCRIPTION OF THE FIGURES

FIG. 23 is a drawing illustrating exemplary bandwidth usage in some embodiments utilizing a time division duplex (TDD) for the wide area network, e.g., for the cellular communications.

FIG. 24 is a drawing illustrating exemplary bandwidth usage in some embodiments utilizing a frequency division duplex (FDD) for the wide area network, e.g., for the cellular communications.

FIG. 25 is a drawing illustrating exemplary frequency bands and shared frequency band usage between wide area network communications usage and peer to peer communications usage in accordance with various embodiments.

DETAILED DESCRIPTION

Figure 1:
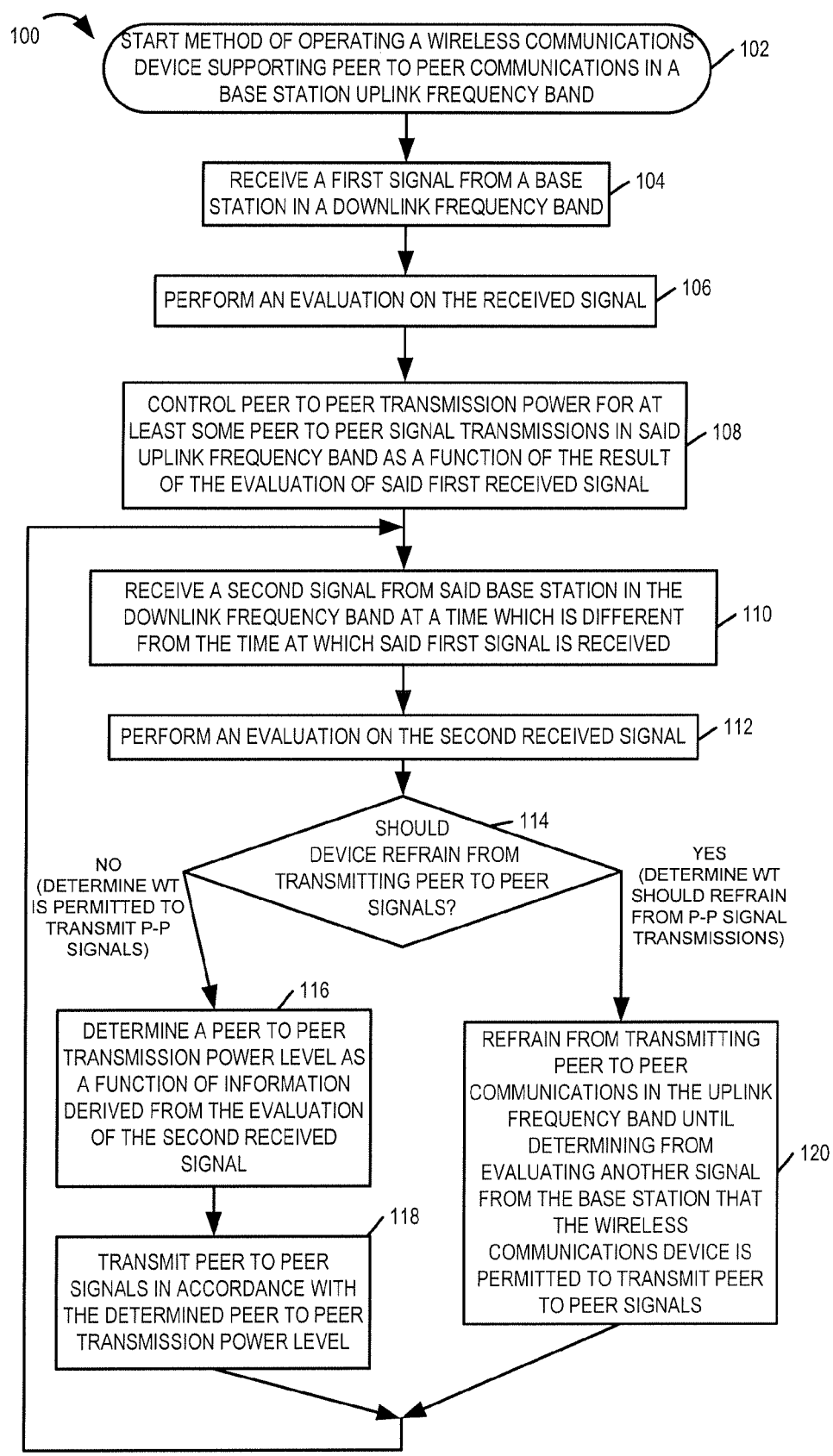
FIG. 1 is a flowchart of an exemplary method of operating a wireless communications device supporting peer to peer communications in a base station uplink frequency band.

FIG. 1 is a flowchart 100 of an exemplary method of operating a wireless communications device supporting peer to peer communications in a base station uplink frequency band. Operation starts in step 102, where the wireless communications device is powered on and initialized and proceeds to step 104. In step 104, the wireless communications device receives a first signal from a base station in a downlink frequency band. The first signal is, in some embodiments, a beacon signal. In some such embodiments, the beacon signal includes at most three OFDM tones, and the tones of the beacon signal have a per tone transmission power level that is at least 10 dBs higher than the average per tone transmission power level of a non-null tone of a peer to peer signal. In some embodiments, the first signal is a broadcast channel signal. In some such embodiments, the broadcast channel signal includes a set of OFDM tones, and the tones of the broadcast channel signal have a per tone transmission power level that is at least 3 dBs higher than the average per tone transmission power level of a non-null tone of a peer to peer signal. In another embodiment, the first signal is a CDMA pilot signal.

In some embodiments, the uplink and downlink frequency bands correspond to different non-overlapping frequency division duplex (FDD) wide area network (WAN) base station communications bands. In some other embodiments, the uplink frequency band corresponds to a base station time division duplex (TDD) band during uplink time slots and the downlink frequency band corresponds to the same base station TDD band during downlink time slots. FIG. 24 illustrates an exemplary WAN FDD spectrum deployment including air link resource sharing with peer to peer signaling. FIG. 23 illustrates an exemplary WAN TDD spectrum deployment including air link resource sharing with peer to peer signaling.

Operation proceeds from step 104 to step 106. In step 106, the wireless communications device performs an evaluation of the received signal. In some embodiments, the evaluation is a signal power measurement. In some embodiments the evaluation is an extraction of encoded information conveyed in the received signal. In various embodiments, the evaluation includes obtaining information from both the received power level of the received signal and extracted encoded information conveyed in the received signal. Operation proceeds from step 106 to step 108.

In step 108, the wireless communications device controls peer to peer transmission power for at least some peer to peer signal transmissions in said uplink frequency band as a result of the evaluation of said first received signal. In some embodiments, controlling peer to peer transmission power includes using a first function which limits peer to peer transmission power to a lower level for a first received signal power level than for a second received signal power level, which is higher than the first received signal power level. In various embodiments, the first function determines a maximum permitted peer to peer transmission power level. Operation proceeds from step 108 to step 110.

In step 110, the wireless communications device receives a second signal from said base station in the downlink frequency band at a time which is different from the time at which said first signal is received. Then, in step 112, the wireless communications device performs an evaluation on the second received signal. Operation proceeds from step 112 to step 114.

In step 114, the wireless communications device determines whether it should refrain from transmitting peer to peer signals. If in step 114, the wireless communications device determines that it should refrain from transmitting peer to peer signals then, operation proceeds from step 114 to step 120. If in step 114 the wireless communications device determines that it is permitted to transmit peer to peer signals, operation proceeds from step 114 to step 116.

In step 116 the wireless communications device determines a peer to peer transmission power level as a function of information derived from the evaluation of the second received signal. Operation proceeds from step 116 to step 118 in which the wireless communications device transmits peer to peer signals in accordance with the determined peer to peer transmission power level.

Returning to step 120, in step 120 the wireless communications device refrains from transmitting peer to peer communications in the uplink frequency band until determining from evaluating another signal from the base station that the wireless communications device is permitted to transmit peer to peer signals. Operation proceeds from step 118 or step 120 to step 110 where the wireless communications device receives another signal from the base station.

Figure 2:
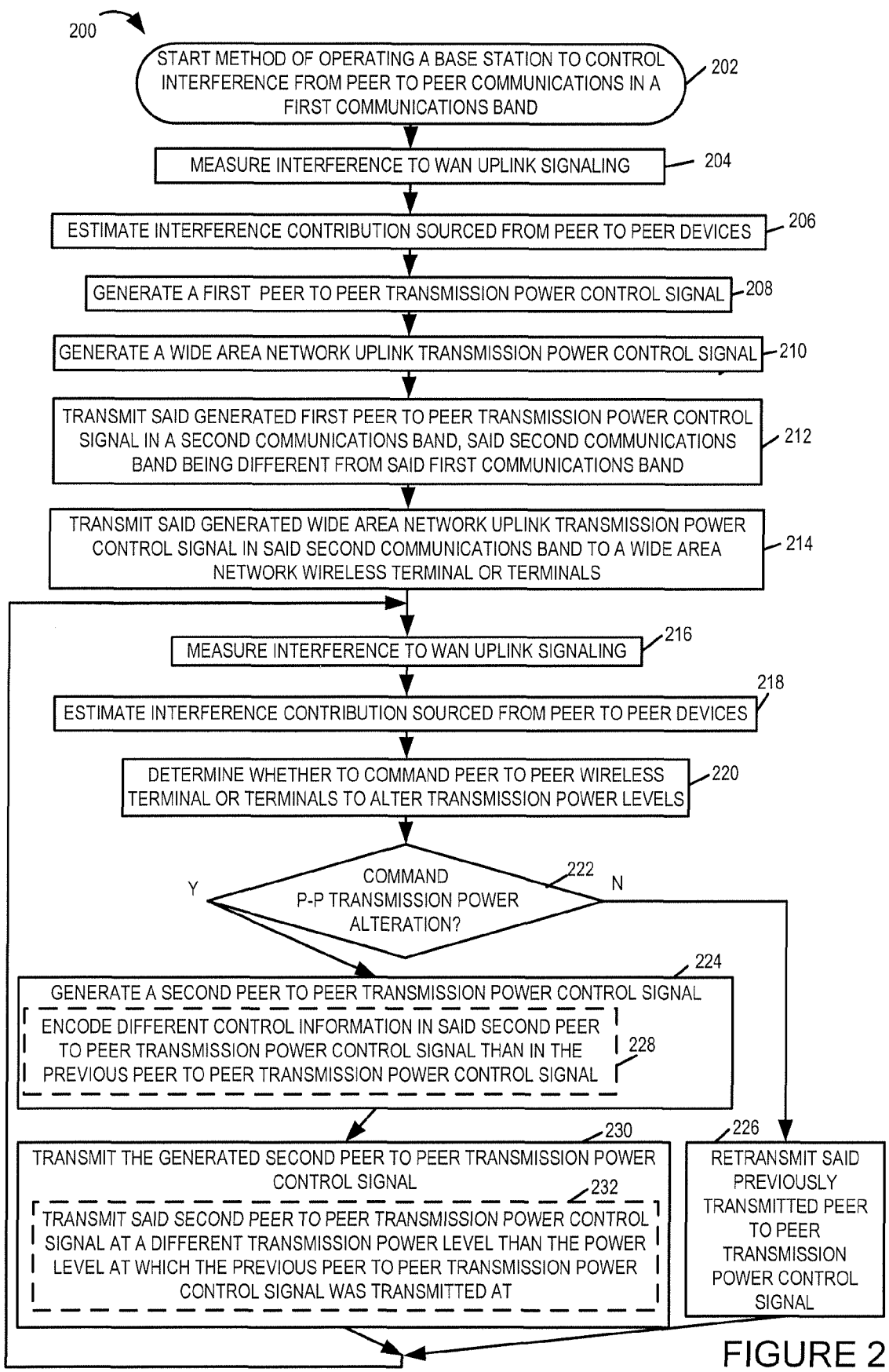
FIG. 2 is a flowchart of an exemplary method of operating a base station to control interference from peer to peer communications in a first communications band.

FIG. 2 is a flowchart 200 of an exemplary method of operating a base station to control interference from peer to peer communications in a first communications band. The first communications band is utilized for both: (i) wide area network uplink signaling directed from a wide area network wireless terminal to the base station and (ii) peer to peer communications signaling between two peer to peer wireless terminals. Operation starts in step 202 where the exemplary base station is powered on and initialized and proceeds to step 204. In step 204, the base station measures interference to wide area network uplink signaling. Operation proceeds from step 204 to step 206. In step 206, the base station estimates the interference contribution sourced from peer to peer devices. Then, in step 208, the base station generates a first peer to peer transmission power control signal and in step 210 the base station generates a wide area network uplink transmission power control signal. Operation proceeds from step 210 to step 212.

In step 212 the base station transmits the generated first peer to peer transmission power control signal in a second communications band, said second communications band being different from said first communications band, and in step 214, the base station transmits the generated wide area network uplink transmission power control signal in said second communications band to a wide area network wireless terminal or terminals. The second communications band is utilized for conveying both: (i) a downlink signal from the base station directed to a wide area network wireless terminal and (ii) a peer to peer transmission power control signal to a peer to peer wireless terminal.

In some embodiments, the first communications band is a frequency division duplex (FDD) wide area network (WAN) uplink frequency band and the second communications band is a frequency division duplex (FDD) wide area network (WAN) downlink frequency band. In some such embodiments, the uplink frequency band and downlink frequency band are non-overlapping and form a corresponding pair. In some other embodiments, the first communications band is a base station time division duplex (TDD) band during uplink time slots and the second communications band is the same base station time division duplex (TDD) band during downlink time slots. FIG. 24 illustrates an exemplary WAN FDD spectrum deployment including air link resource sharing with peer to peer signaling. FIG. 23 illustrates an exemplary WAN TDD spectrum deployment including air link resource sharing with peer to peer signaling.

In some embodiments, the peer to peer transmission power control signal is a beacon signal. In some such embodiments, the beacon signal includes at most three OFDM tones and the tones of the beacon signal have a per tone transmission power level that is at least 10 dBs higher than the average per tone transmission power level of a non-null tone of a peer to peer signal.

In some embodiments, the peer to peer transmission power control signal is a broadcast channel signal. In some such embodiments, the broadcast channel signal includes a set of OFDM tones and the tones of the broadcast channel signal have a per tone transmission power level at least 3 dBs higher than the average per tone transmission power level of a non-null tone of a peer to peer signal.

In some other embodiments, the peer to peer transmission power control signal is a CDMA pilot signal.

Operation proceeds from step 214 to step 216. In step 216, the base station measures interference to WAN uplink signaling and in step 218 the base station estimates the interference contribution sourced from peer to peer devices. Operation proceeds from step 218 to step 220. In step 220 the base station determines whether to command peer to peer wireless terminal or terminals to alter transmission power levels. Operation proceeds from step 220 to step 222. In step 222, if the base station decides to command a peer to peer transmission power alteration, operation proceeds from step 222 to step 224; otherwise, operation proceeds from step 222 to step 226.

Returning to step 224, in step 224, the base station generates a second peer to peer transmission power control signal. In some embodiments, step 224 includes sub-step 228 in which the base station encodes different control information in said second peer to peer transmission power control signal than in the previous peer to peer transmission power control signal. In some such embodiments, the encoded information is to be used by a peer to peer wireless terminal in regulating its peer to peer transmission power level, e.g., in determining a maximum permitted peer to peer transmission power level. Operation proceeds from step 224 to step 230. In step 230, the base station transmits the generated second peer to peer transmission power control signal. In some embodiments, step 230 includes sub-step 232 in which the base station transmits said second peer to peer transmission power control signal at a different transmission power level than the power level at which the previous peer to peer transmission power control signal was transmitted at. In some such embodiments, the received power level of a peer to peer transmission power control signal is to be used by a peer to peer wireless terminal in regulating its peer to peer transmission power level, e.g., in determining a maximum permitted peer to peer transmission power level.

Returning to step 226, in step 226, the base station retransmits the previously transmitted peer to peer transmission power control signal. Operation proceeds from step 230 or step 226 to step 216, where interference to WAN uplink signaling is measured.

Figure 3:
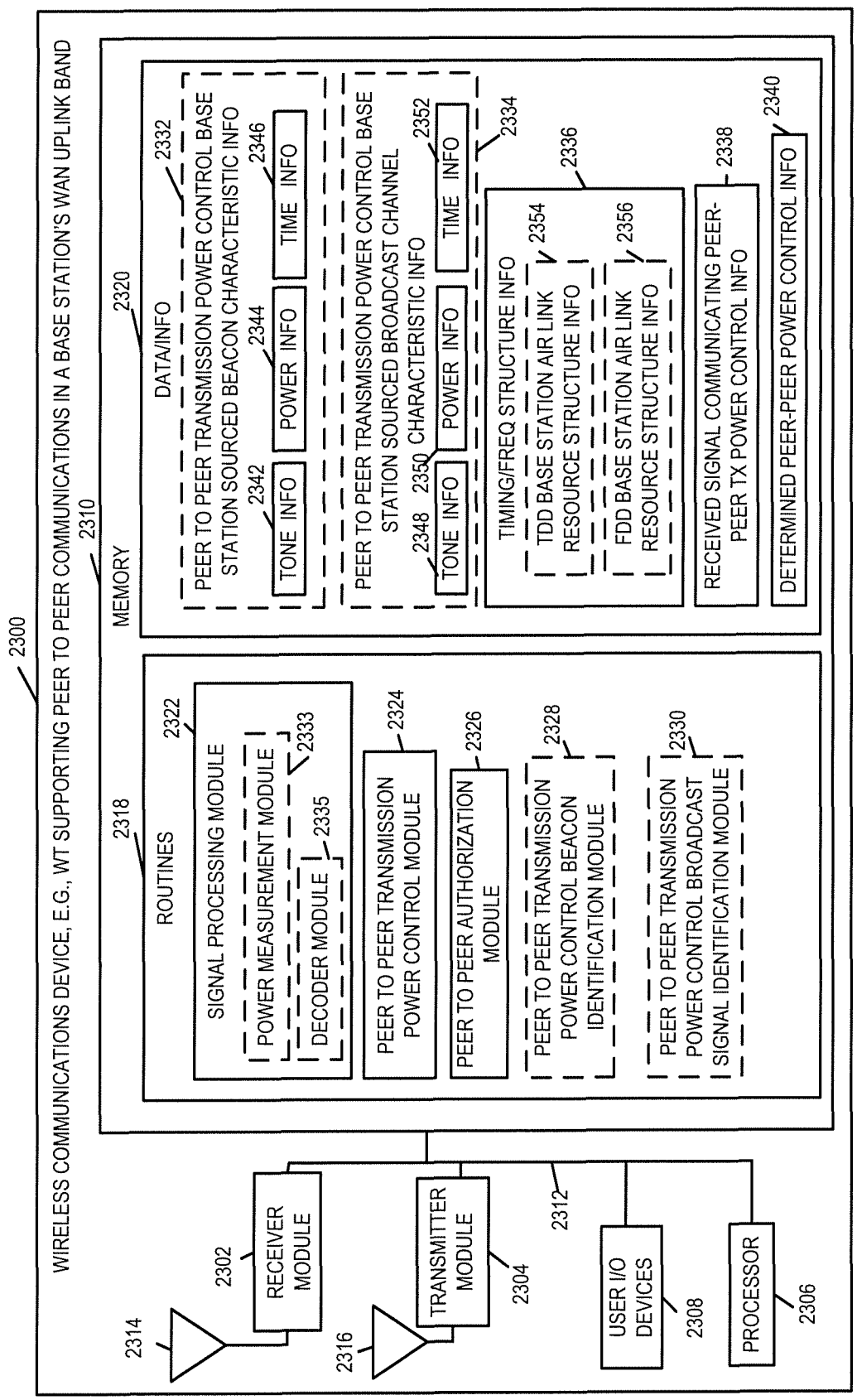
FIG. 3 is a drawing of an exemplary wireless communications device, e.g., wireless terminal such as a mobile node, supporting peer to peer communications in a base station's WAN uplink band in accordance with various embodiments.

FIG. 3 is a drawing of an exemplary wireless communications device 2300, e.g., a wireless terminal such as a mobile node, supporting peer to peer communications in a base station's WAN uplink band in accordance with various embodiments. Exemplary wireless communications device 2300 receives a signal from a base station in a downlink frequency band of the base station which it utilizes in determining whether or not it is permitted to transmit peer to peer signals into the base station's uplink band and/or in determining peer to peer transmission power level information, e.g., a maximum peer to peer transmission power level.

Wireless communications device 2300 includes a receiver module 2302, a transmitter module 2304, user I/O devices 2308, a processor 2306, and memory 2310 coupled together via a bus 2312 over which the various elements may interchange data and information. Memory 2310 includes routines 2318 and data/information 2320.

The processor 2306, e.g., a CPU, executes the routines 2318 and uses the data/information 2320 in memory 2310 to control the operation of the wireless communications device 2300 and implement methods, e.g., the method of flowchart 100 of FIG. 1.

Receiver module 2302, e.g., an OFDM receiver, is coupled to receive antenna 2314 via which the wireless communications device 2300 receives a signal from a base station, e.g., a beacon signal or a broadcast channel non-beacon signal, said received signal used in determining peer to peer transmission power level information, said received signal being received in a base station downlink frequency band. Receiver module 2302 also receives peer to peer communications signals in an uplink frequency band of the base station. In some embodiments, during some times, receiver module 2302 receives downlink signals, e.g., assignment signals and traffic signals, from a base station that the wireless communications device is using as a point of attachment in a wide area network, with the communications device 2300 functioning as a cellular communications device.

Transmitter module 2304, e.g., an OFDM transmitter, is coupled to transmit antenna 2316, via which the wireless communications device 2300 transmits peer to peer signals to other wireless communications devices using a base station uplink frequency band. In some embodiments, during some time intervals, the transmitter module 2304 transmits uplink signals to a base station, with the wireless communications device functioning in a WAN mode of operation, e.g., a cellular mode of operation.

User I/O devices 2308 include, e.g., microphone, keyboard, keypad, mouse, camera, switches, speaker, display, etc. User I/O devices 2308 allow a user of wireless communications device 2300 to input data/information, access output data/information, and control at least some functions of the wireless communications device 2300, e.g., attempt to initiate a peer to peer communications session.

Routines 2318 include a signal processing module 2322, a peer to peer transmission power control module 2324, and a peer to peer authorization module 2326. In various embodiments the wireless communications device 2300 includes one or more of peer to peer transmission power control beacon identification module 2328 and peer to peer transmission power control broadcast signal identification module 2330. Signal processing module 2322, in various embodiments, includes one or more of power measurement module 2333 and decoder module 2335.

Data/information 2320 includes timing/frequency structure information 2336, received signal communicating peer to peer transmission power control information 2338 and determined peer to peer power control information 2340. Data/information 2320, in various embodiments, includes one or more of peer to peer transmission control base station sourced beacon characteristic information 2332 and peer to peer transmission power control base station sourced broadcast channel characteristic information 2334.

Peer to peer transmission power control base station sourced beacon characteristic information 2332 includes tone information 2342, power information 2344 and time information 2346. Peer to peer transmission power control base station sourced broadcast channel characteristic information 2344 includes tone information 2348, power information 2350 and time information 2352. Timing/frequency structure information 2336 includes one or more of TDD base station air link resource structure information 2354 and FDD base station air link resource structure information 2356.

Signal processing module 2322 performs an evaluation of the received signal from the base station received in the downlink frequency band, said received signal being used to influence peer to peer transmission power of wireless communications device 2300. Power measurement module 2333 measures the received power of the received signal. Decoder module 2335 extracts encoded information conveyed in the received signal. In some embodiments, the signal processing module 2322 includes both power measurement module 2333 which measures the received power level of the received signal and decoder module 2335 which extracts encoded information conveyed in the received signal, and the evaluating includes obtaining information from both the received power level of the received signal and extracted information conveyed in the received signal.

In some embodiments the received signal from the base station is a beacon signal. For example, the received signal is a beacon signal including at most three OFDM tones and the tones of the beacon signal are transmitted at a per tone transmission power level that is at least 10 dBs higher than the average per tone transmission power level of a non-null tone of a peer to peer signal.

In some embodiments, the received signal from the base station is a broadcast channel signal. For example, the received signal is a broadcast channel signal including a set of OFDM tones, and the tones of the broadcast channel signal are transmitted at a per tone transmission power level that is at least 3 dBs higher than the average per tone transmission power level of a non-null tone of a peer to peer signal.

In some other embodiments, the received signal from the base station is a CDMA pilot signal. In some such embodiments, the CDMA pilot signal's reception power level is used as an input by the wireless communications device in determining a peer to peer transmission power level in the wireless communications device 2300.

Peer to peer transmission power control module 2324 controls peer to peer transmission power for at least some peer to peer transmission signals in a base station uplink frequency band as a function of the result of the evaluation of the received signal from the base station in the downlink frequency band. In various embodiments, the peer to peer transmission power control module 2324 controls peer to peer transmission power using a first function which limits peer to peer transmission power to a lower level for a first received signal power level than for a second received signal power level which is higher than said first received signal power level. For example, for a given input range of received power, the maximum permitted peer to peer transmission power level follows an inverse linear relationship. In various embodiments, the first function determines a maximum permitted peer to peer transmission power, and the actual peer to peer transmission power is controlled to be less than or equal to the determined maximum permitted peer to peer transmission power level.

Peer to peer authorization module 2326 determines from an evaluation of the received signal from the base station whether the wireless communications device is permitted to transmit peer to peer communications signals in the uplink frequency band. Peer to peer transmission power control beacon identification module 2328 uses the information in memory 2310 including peer to peer transmission power control base station sourced beacon characteristic information 2332 to identify a base station sourced beacon signal used in peer to peer power transmission power control from among a plurality of signals being communicated in a base station downlink frequency band. Peer to peer transmission power control broadcast signal identification module 2330 uses the information in memory 2310 including peer to peer transmission power control base station sourced broadcast signal characteristic information 2334 to identify a base station sourced non-beacon broadcast signal used in peer to peer power transmission power control from among a plurality of signals being communicated in a base station downlink frequency band.

Tone information 2342 includes, e.g., information identifying the number and location of OFDM tones in a beacon signal used for peer to peer transmission power control. Power information 2344 includes information identifying power levels of beacon signals, e.g., information used to distinguish a received beacon from among other received downlink signals. Power information 2344 also includes information used to relate a received beacon signal power level to peer to peer transmission power control information. Time information 2346 includes, e.g., information identifying the position in a recurring downlink timing structure of a beacon signal designated to be used for peer to peer transmission power control, e.g., OFDM symbol index information.

Tone information 2348 includes, e.g., information identifying the number and location of OFDM tones in a broadcast signal used for peer to peer transmission power control. Power information 2350 includes information identifying power levels of broadcast signals, e.g., information used to distinguish a received broadcast signal designated for use in peer to peer power control from among other received downlink signals. Power information 2350 also includes information used to relate a received broadcast signal power level to peer to peer transmission power control information. Time information 2352 includes, e.g., information identifying the position in a recurring downlink timing structure of a broadcast signal designated to be used for peer to peer transmission power control, e.g., OFDM symbol index information.

TDD base station air link resource structure information 2354 includes information identifying a TDD band used by a WAN base station. For example, the information 2354 includes information identifying the uplink frequency band which corresponds to the base station TDD band during uplink time slots and information identifying the downlink frequency band which corresponds to the base station TDD band during downlink time slots.

FDD base station air link resource structure information 2356 includes information identifying a different non-overlapping FDD WAN base station communications bands. For example, the information 2356 includes information identifying the uplink frequency band which is a FDD WAN band, and information identifying the downlink frequency band which is a different FDD WAN band, the uplink and downlink bands forming a pair.

Received signal communicating peer to peer transmission power control information 2338 is, e.g., a beacon signal or a non-beacon broadcast channel signal, received by receiver module 2302, which has been identified by one of identification modules 2328, 2330 and which is processed by signal processing module 2322. Determined peer to peer power control information 2340 includes, e.g., information identifying whether or not the wireless communications device 2300 is permitted to transmit peer to peer signals, information identifying a determined maximum allowed peer to peer transmission power level, and/or information identifying an actual determined peer to peer transmission power level.

Figure 4:
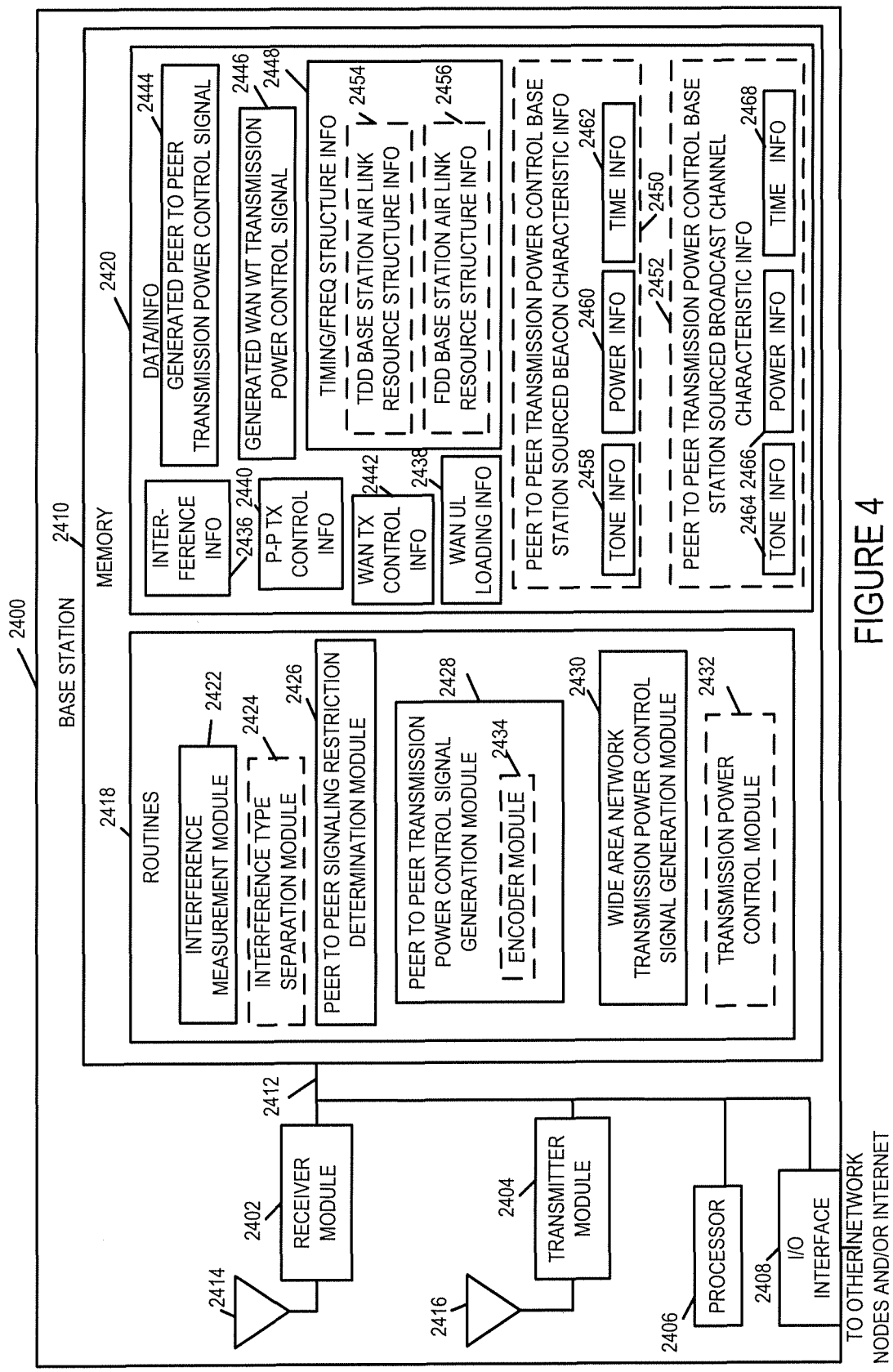
FIG. 4 is a drawing of an exemplary base station in accordance with various embodiments, the base station generating and transmitting signals used for peer to peer transmission power control.

FIG. 4 is a drawing of an exemplary base station 2400 in accordance with various embodiments. Exemplary base station 2400 manages reception interference from peer to peer wireless terminals transmitting into the same air link resources used for its wide area network uplink communications. For example, the same first communications band is utilized for both: (i) wide area network uplink signaling directed from a wide area network wireless terminal to base station 2400 and (ii) peer to peer communications signaling between two peer to peer wireless terminals. Exemplary base station 2400 determines and transmits into a downlink frequency band a power control signal utilized by peer to peer wireless terminals in determining their transmission power level. Exemplary base station 2400 also determines and transmits into the downlink frequency band a different power control signal utilized by a WAN wireless terminal in determining its uplink transmission power. Thus a second communications band is utilized for conveying both: (i) a downlink signal directed to a wide area network wireless terminal to control its transmit power control and (ii) a peer to peer power control signal to a peer to peer communications device.

Exemplary base station 2400 includes a receiver module 2402, a transmitter module 2404, a processor 2406, an I/O interface 2408, and a memory 2410 coupled together via a bus 2412 over which the various elements may interchange data and information.

Receiver module 2402, e.g., an OFDM receiver, is coupled to receive antenna 2414 via which the base station 2400 receives uplink signals from wireless terminals, e.g., wireless terminals functioning in a cellular mode and using the base station 2400 as a point of network attachment. Receiver module 2402 also receives interference from peer to peer communications devices operating in the local vicinity. In some embodiments, receiver module 2402 also receives interference from uplink signaling from cellular devices in adjacent cells.

Transmitter module 2404, e.g., an OFDM transmitter, is coupled to transmit antenna 2416, via which the base station 2400 transmits downlink signals to wireless terminals using base station 2400 as a point of network attachment. Such downlink signals include a power control signal directed to a WAN wireless terminal. Transmitter module 2404 also transmits, into a base station downlink band, a generated transmission power control signal, e.g., signal 2444, to be used by peer to peer wireless terminals to control their transmission power level, the peer to peer wireless terminals using the base station's uplink band for peer to peer signaling and thus producing interference from the perspective of the base station receiver module 2402.

Memory 2410 includes routines 2418 and data/information 2420. The processor 2406, e.g., a CPU, executes the routines 2418 and uses the data/information 2420 in memory 2410 to control the operation of the base station 2400 and implement methods, e.g., the method of flowchart 200 of FIG. 2.

Routines 2418 include an interference measurement module 2422, a peer to peer signaling restriction determination module 2426, a peer to peer transmission power control signal generation module 2428, and a wide area peer to peer transmission power signal generation module 2430. In some embodiments, routines 2418 include an interference type separation module 2424. In various embodiments, routines 2418 include a transmission power control module 2432.

Data/information 2420 includes interference information 2436, wide area network uplink loading information 2438, peer to peer transmission control information 2440, wide area network transmission control information 2442, a generated peer to peer transmission power control signal 2444, a generated wide area network wireless terminal transmission power control signal 2446, and timing/frequency structure information 2448. Data/information 2420 includes one or more of peer to peer transmission power control base station sourced beacon characteristic information 2450 and peer to peer transmission power control base station sourced broadcast channel characteristic information 2452. Timing/frequency structure information 2448 includes one or more of TDD base station air link resource structure information 2454 and FDD base station air link resource structure information 2456. Peer to peer transmission power control base station sourced beacon characteristic information 2450 includes tone information 2458, power information 2460, and time information 2462. Peer to peer transmission power control base station sourced broadcast channel characteristic information 2452 includes tone information 2464, power information 2466, and time information 2468.

Peer to peer transmission power control signal generation module 2428 uses the data/information 2420 including peer to peer transmission control information 2440 to generate a peer to peer transmission power control signal, e.g., signal 2444.

Wide area network transmission power control signal generation module 2430 generates a wide area network transmission power control signal, e.g., signal 2446.

Transmission power control module 2432, included in some embodiments, e.g., an embodiment wherein the received power of a peer to peer transmission power control signal is to be used by a peer to peer wireless terminal in regulating its peer to peer transmit power, controls the transmitter module 2404 to transmit generated peer to peer transmission power control signals at different power levels as a function of the peer to peer transmit power control information to be communicated. For example, the transmission power control module 2432 controls the transmitter module 2404 to transmit a second peer to peer transmission power control signal at a different power level than a first peer to peer transmission power control signal, and the received power of a peer to peer transmission power control signal is to be used by a peer to peer wireless terminal in regulating its peer to peer transmission power level.

In some embodiments, the peer to peer transmission power control signal generation module 2428 includes an encoder module 2434 for encoding peer to peer transmission power control information into a generated peer to peer transmission power control signal. For example, encoder module 2434 encodes in a second peer to peer transmission power control signal different encoded control information than in a first peer to peer transmission power control signal, and the encoded information is to be used by a peer to peer wireless terminal in regulating its peer to peer transmission power level.

Peer to peer signaling restriction determination module 2426 determines whether peer to peer signaling is to be allowed in a first communications band, e.g., an uplink communications band of the base station or whether peer to peer communications is to be restricted in said first communications band. In various embodiments, the peer to peer signaling restriction determination module 2426 utilizes interference information 2436 and/or WAN uplink loading information 2438 in making a decision. The decision of peer to peer restriction determination module 2426 is communicated via a generated peer to peer transmission power control signal 2444.

Interference measurement module 2422 measures interference from the perspective of the receiver module 2402 attempting to receive and recover WAN uplink signals from WAN wireless terminals using the base station 2400 as a point of network attachment. Interference can be, and sometimes is, from a plurality of sources including adjacent cell WAN wireless terminal uplink signaling in adjacent base stations' cells and peer to peer signaling using the same uplink communications band. Interference type separation module 2424 distinguishes between interference due to peer to peer signaling and interference signaling from other sources, e.g., uplink signals from a WAN WT using an adjacent base station as its point of attachment. Peer to peer signaling restriction determination module 2426, peer to peer transmission power control signal generation module 2428 and/or transmission power control module 2432 uses interference information from modules 2422 and/or 2424 and/or WAN loading information 2438 in making decisions to control peer to peer transmission power levels.

Tone information 2458 includes, e.g., information identifying the number and location of OFDM tones used by module 2428 to generate a peer to peer transmission power control signal which is a beacon signal. In some embodiments, the beacon signal includes at most three OFDM tones. Power information 2460, e.g., information identifying beacon tone transmit power levels, is used by module 2428 to generate a peer to peer transmission power control signal which is a beacon signal. In some embodiments, a tone of the beacon signal has a per tone transmission power level that is at least 10 dBs higher than the average per tone transmission power level of a non-null tone of a peer to peer signal. Power information 2460 also includes, in some embodiments, information used to relate beacon signal transmit power variations to changes in communicated peer to peer transmission power information. Such power variation information is utilized by transmission power control module 2432 in some embodiments, wherein the received power level of a beacon signal communicates information about peer to peer transmission power. Time information 2462 includes, e.g., information identifying the position in a recurring downlink timing structure of a beacon signal designated to be used for peer to peer transmission power control, e.g., OFDM symbol index information.

Tone information 2464 includes, e.g., information identifying the number and location of OFDM tones used by module 2428 to generate a peer to peer transmission power control signal which is a broadcast channel signal. Power information 2466, e.g., information identifying tone transmit power levels, is used by module 2428 to generate a peer to peer transmission power control signal which is a broadcast channel signal. In some embodiments, a tone of a base station broadcast channel signal used for communicating peer to peer transmit power control information has a per tone transmission power level that is at least 3 dBs higher than the average per tone transmission power level of a non-null tone of a peer to peer signal. Power information 2466 also includes, in some embodiments, information used to relate broadcast channel signal transmit power variations to changes in communicated peer to peer transmission power information. Such power variation information is utilized by transmission power control module 2432 in some embodiments, wherein the received power level of a broadcast channel signal communicates information about peer to peer transmission power. Time information 2468 includes, e.g., information identifying the position in a recurring downlink timing structure of a broadcast channel signal designated to be used for peer to peer transmission power control, e.g., OFDM symbol index information.

TDD base station air link resource structure information 2454 includes information identifying a TDD band used by a WAN base station in an embodiment where the base station 2400 uses TDD for WAN signaling. For example, the information 2454 includes: (i) information identifying the uplink frequency band which corresponds to the base station TDD band during uplink time slots and (ii) information identifying the downlink frequency band which corresponds to the base station TDD band during downlink time slots. TDD base station air link resource structure information 2454 also includes information identifying air link resources in downlink time slots of the TDD band designated to be used to communicate a peer to peer transmission power control signal, e.g., a beacon or broadcast channel signal used for peer to peer transmission power control.

FDD base station air link resource structure information 2456 includes information identifying a different non-overlapping FDD WAN base station communications bands in an embodiment where the base station uses FDD for WAN signaling. For example, the information 2456 includes information identifying the uplink frequency band which is a FDD WAN band, and information identifying the downlink frequency band which is a different FDD WAN band, the uplink and downlink bands forming a pair. FDD base station air link resource structure information 2456 also includes information identifying which air link resources of the downlink FDD band are designated to be used for communicating a peer to peer transmission power control signal, e.g., a beacon or broadcast channel signal used for peer to peer transmission power control.

In some embodiments, at least some of the generated WAN wireless terminal transmission power control signals are directed to individual identified WAN wireless terminals, and the generated peer to peer transmission power control signals are not directed to any particular identified peer to peer wireless terminal but rather to any peer to peer wireless terminal in the local vicinity. In some embodiments, at least some of the transmitted WAN wireless terminal power control signals include a wireless terminal identifier and the transmitted peer to peer transmission power control signals do not include a wireless terminal identifier.

Figure 5:
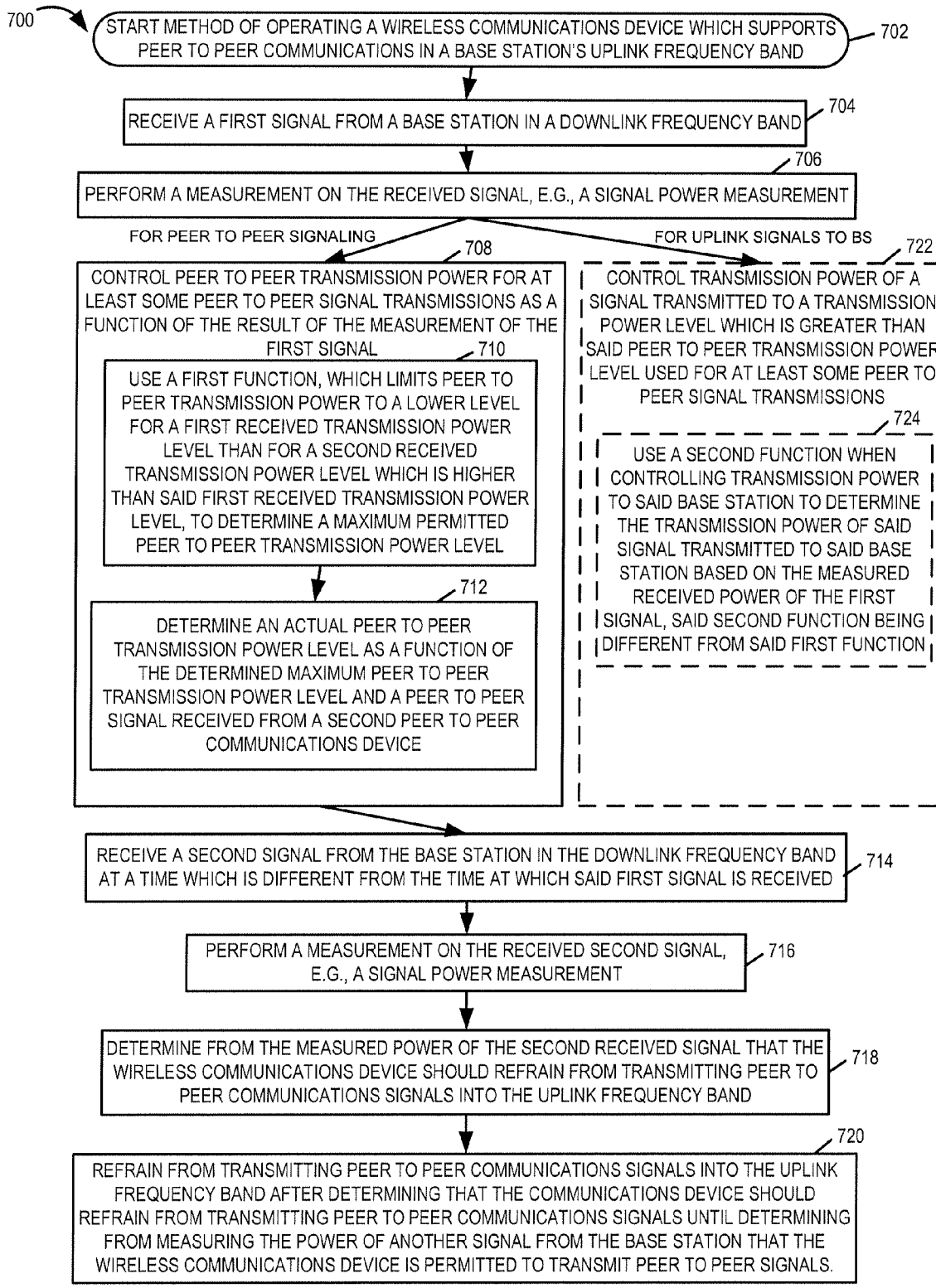
FIG. 5 is a flowchart of an exemplary method of operating a wireless communications device which supports peer to peer signaling in accordance with various embodiments.

FIG. 5 is a flowchart 700 of an exemplary method of operating a wireless communications device which supports peer to peer signaling in an uplink frequency band in accordance with various embodiments. Operation starts in step 702, where the wireless communications device is powered on and initialized and proceeds to step 704, where the wireless communications device receives a first signal, e.g., a reference and/or control signal, from a base station in a downlink frequency band used by said base station. This approach of using the downlink band of the base station to convey a reference and/or control signal is simple from the base station's perspective as the base station can easily include the first signal intended for peer to peer wireless terminals as part or its set of broadcast signals. The first signal is, in some embodiments, a beacon signal. In other embodiments, the first signal is a non-beacon broadcast channel signal. The peer to peer wireless communications device monitors the base station downlink band for the first signal and uses the base station's uplink band to exchange peer to peer signals with other peer nodes. In some embodiments, the peer to peer wireless communications device includes receiver capabilities to be tuned concurrently to multiple bands, so as to receive signals from both (i) the base station's downlink band for receiving the reference and/or control signal from the base station and (ii) the base station's uplink band for receiving peer to peer signals from other peer to peer wireless communications devices. In some embodiments, the peer to peer wireless communications device supports reception from only a single band at a given time, and the peer to peer device's receiver is switched between the base station's downlink band and the base station's uplink band as a function of whether a downlink broadcast reference and/or control signal is to be received from the base station or whether a peer to peer communications signal is to be received from a peer communications device.

Operation proceeds from step 704 to step 706. In step 706, the wireless communications device performs a measurement on the received signal, e.g., a signal power measurement. Operation proceeds to one or more of steps 708 and 722. In some embodiments, the wireless communications device supports peer to peer signaling, but does not support uplink signaling to the base station, e.g., as part of a cellular network, and in such embodiments, step 722 is not an option. In some embodiments, the wireless communications device supports, at any given time one of a peer to peer mode and a cellular mode of operation, and for a given time, operation can proceed to one of step 708 and step 722. In some embodiments, the wireless communications device supports concurrent peer to peer signaling and cellular signaling and operation may proceed from step 706 to steps 708 and step 722.

Operation proceeds from step 706 to step 708 for peer to peer signaling, while operation proceeds from step 706 to step 722 for uplink signals to the base station. In step 708, the wireless communications device controls peer to peer transmission power for at least some peer to peer signal transmissions as a function of the result of the measurement of the first signal. Step 708 includes sub-steps 710 and 712. In sub-step 710, the wireless communications device uses a first function, which limits peer to peer transmission power to a lower level for a first received signal power level than for a second received signal power level which is higher than said first received signal power level, to determine a maximum transmission permitted peer to peer transmission power level. Then, in sub-step 712, the wireless communications device determines an actual peer to peer transmission power level as a function of the determined maximum peer to peer transmission power level and a peer to peer signal received from a second peer to peer communications device. The second peer to peer communications device is, e.g., the peer device with which the communications device performing the operations of flowchart 700 is having a peer to peer communications session. Thus, the peer to peer transmission power level, in some embodiments, is influenced by both a received base station signal and a peer to peer signal. The peer to peer signal, in some embodiments, communicates and/or is used to derive at least one of: peer to peer channel condition information, peer to peer data rate information, peer to peer data backlog information, peer to peer latency information, noise information, error rate information, service level information and peer to peer power control information. In some embodiments, the actual peer to peer transmission power is restricted to be equal to or below the determined maximum peer to peer transmission power level. In some embodiments, for at least some conditions, e.g., a high priority user or a certain service level, the actual peer to peer transmission level can sometimes exceed, e.g., override, the determined maximum peer to peer transmission power level which is based on the received base station signal. Operation proceeds from step 708 to step 714.

In step 714, the wireless communications device receives a second signal from the base station in the downlink frequency band at a time which is different from the time at which said first signal is received. Then, in step 716, the wireless communications device performs a measurement of the received second signal, e.g., a power measurement of the received second signal. Operation proceeds from step 716 to step 718, in which the wireless communications device determines from the measured power of the second received signal that the wireless communications device should refrain from transmitting peer to peer communications signals into the uplink frequency band. Operation proceeds from step 718 to step 720. In step 720, the wireless communications device refrains from transmitting peer to peer communications signals into the uplink frequency band after determining that the communications device should refrain from transmitting peer to peer communications signals until determining from measuring the power of another signal from the base station that the wireless communications device is permitted to transmit peer to peer signals into the uplink frequency band.

Returning to step 722, in step 722, the wireless communications device controls transmission power of a signal transmitted to a transmission power level which is greater than said peer to peer transmission power level used for at least some peer to peer signal transmissions. Step 722 includes sub-step 724. In sub-step 724, the wireless communications device uses a second function when controlling transmission power to said base station to determined the transmission power of said signal transmitted to said base station based on the measured power of the received first signal, said second function being different from said first function. In some embodiments, the peer to peer transmission signal power level is at least 10 dBs below the transmission power level of the said signal transmitted to the base station.

Figure 6:
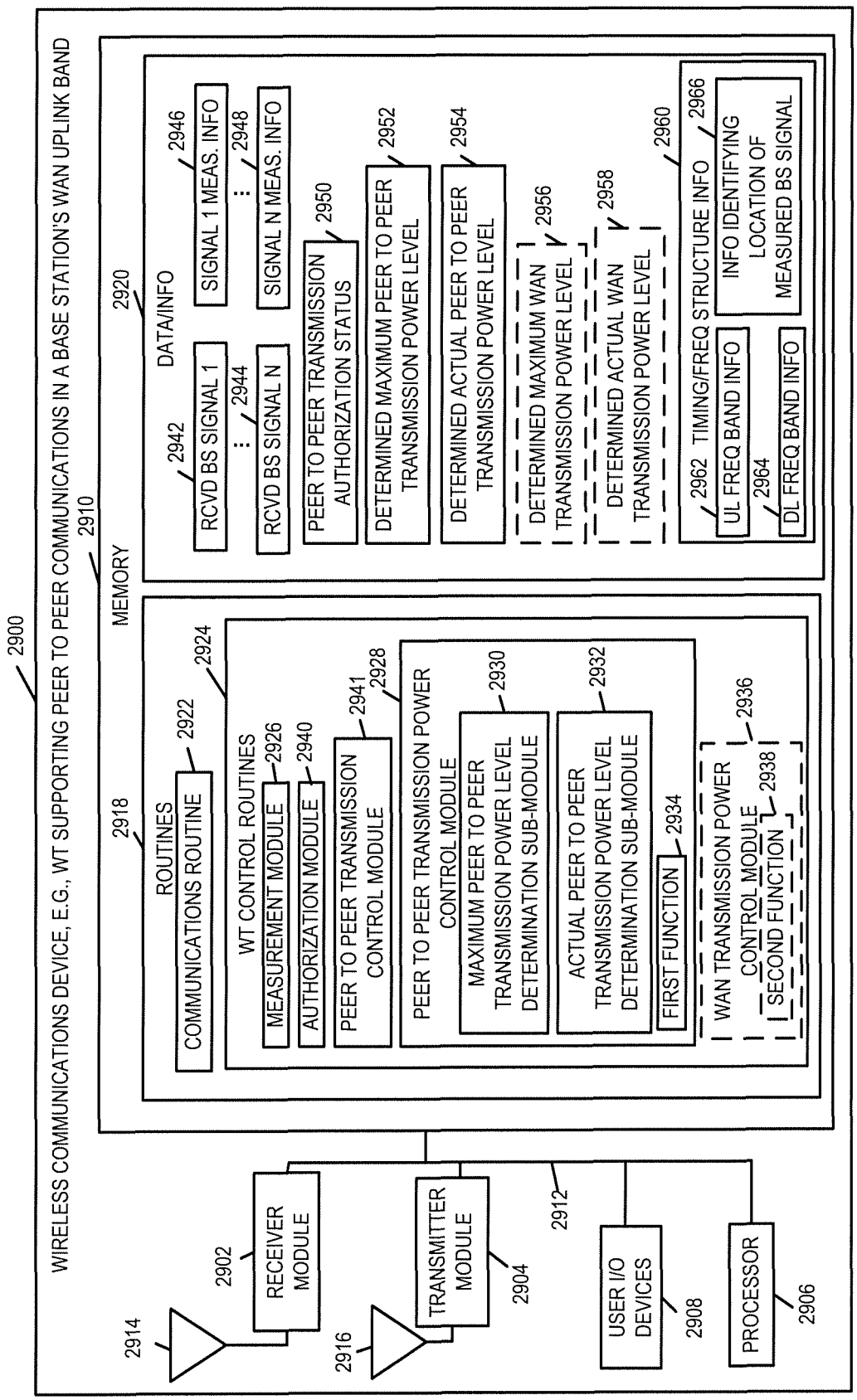
FIG. 6 is a drawing of an exemplary wireless communications device, e.g., a wireless terminal such as a mobile node, supporting peer to peer communications in accordance with various embodiments.

FIG. 6 is a drawing of an exemplary wireless communications device 2900, e.g., wireless terminal such as a mobile node, supporting peer to peer communications in a base station's WAN uplink band accordance with various embodiments. Exemplary wireless communications device 2900 receives a signal from a base station in a downlink frequency band of the base station which it utilizes in determining whether or not it is permitted to transmit peer to peer signals into the base station's uplink band and/or in determining peer to peer transmission power level information, e.g., a maximum peer to peer transmission power level.

Wireless communications device 2900 includes a receiver module 2902, a transmitter module 2904, user I/O devices 2908, a processor 2906, and memory 2910 coupled together via a bus 2912 over which the various elements may interchange data and information. Memory 2910 includes routines 2918 and data/information 2920.

The processor 2906, e.g., a CPU, executes the routines 2918 and uses the data/information 2920 in memory 2910 to control the operation of the wireless communications device 2900 and implement methods.

Receiver module 2902, e.g., an OFDM receiver, is coupled to receive antenna 2914 via which the wireless communications device 2900 receives a signal from a base station, e.g., a beacon signal or a broadcast channel non-beacon signal, said received signal used in determining peer to peer transmission power level information, said received signal being received in a base station downlink frequency band. Receiver module 2902 also receives peer to peer communications signals in an uplink frequency band of the base station. In some embodiments, during some times, receiver module 2902 receives downlink signals, e.g., assignment signals and traffic signals, from a base station that the wireless communications device is using as a point of attachment in a wide area network, with the communications device 2900 functioning as a cellular communications device.

Transmitter module 2904, e.g., an OFDM transmitter, is coupled to transmit antenna 2916, via which the wireless communications device 2900 transmits peer to peer signals to other wireless communications devices using a base station uplink frequency band. In some embodiments, during some time intervals, the transmitter module 2904 transmits uplink signals to a base station, with the wireless communications device functioning in a WAN mode of operation, e.g., a cellular mode of operation.

User I/O devices 2908 include, e.g., microphone, keyboard, keypad, mouse, camera, switches, speaker, display, etc. User I/O devices 2908 allow a user of wireless communications device 2900 to input data/information, access output data/information, and control at least some functions of the wireless communications device 2900, e.g., attempt to initiate a peer to peer communications session.

Routines 2918 include a communications routine 2922 and wireless terminal control routines 2924. The communications routine 2922 implements the various communications protocols used by the wireless communications device 2900. Wireless terminal control routines 2924 include a measurement module 2926, an authorization module 2940, peer to peer transmission control module 2941 and a peer to peer transmission power control module 2928. In some embodiments, e.g., an embodiment supporting both peer to peer communications and WAN communications, e.g., cellular communications, the wireless terminal control routines 2924 include a wide area network transmission power control module 2936.

Measurement module 2926 performs a measurement on a received signal from a base station. Signals (2942, 2944) represent inputs to measurement module 2926 while information (2946, 2948) represent outputs of measurement module 2926. In various embodiments, the measurement of measurement module 2926 is a signal power measurement.

Authorization module 2940 can, and sometimes does, determine from the measured power of a received base station signal that the wireless communications device 2900 should refrain from transmitting peer to peer signals. Authorization module 2940 can, and sometimes does, determine from the measured power of a received base station signal that the wireless communications device 2900 is permitted to transmit peer to peer signals. Peer to peer transmission authorization status 2950 is an output of authorization module 2940 and is used as an input by peer to peer transmission control module 2941.

Peer to peer transmission control module 2941 controls the wireless transmitter module 2904 to refrain from transmitting peer to peer communications signals after determining that the communications device 2900 should refrain from transmitting peer to peer signals until determining that the wireless communications device 2900 is permitted to transmit peer to peer signals. Thus peer to peer transmission control module

2941, using peer to peer transmission authorization status 2950, functions as a peer to peer transmit enable/disable controller.

Peer to peer transmission power control module 2928 controls peer to peer transmission power for at least some peer to peer signal transmissions as a function of the result of a measurement of a received base station signal. Peer to peer transmission power control module 2928 includes a maximum peer to peer transmission power level determination sub-module 2930, an actual peer to peer transmission power level determination sub-module 2932 and a first function 2934. The peer to peer transmission power control module 2928 uses the first function 2934 which limits peer to peer transmission power to a lower level for a first received signal power level than for a second received signal power level which is higher than said first received signal power level. In various embodiments, the peer to peer transmission power control module 2928 limits peer to peer transmission power to lower levels in response to greater measured received signal power levels.

Maximum peer to peer transmission power level sub-module 2930 uses the first function 2934 to determine a maximum peer to peer transmission power level. Actual peer to peer transmission power level sub-module 2932 determines an actual peer to peer signal transmission power level as a function of said maximum peer to peer transmission power level and a peer to peer signal received from a second peer to peer communications device. In various embodiments, sub-module 2932 controls the actual determined peer to peer transmission power level to be less than or equal to the maximum peer to peer transmission power level.

Wide area network transmission power control module 2936 controls transmission power of a signal transmitted to the base station to a transmission power level which is greater than said peer to peer transmission power level used for at least some peer to peer signal transmission. WAN transmission power control module 2936 includes a second function 2938 which is different from the first function 2934. The wide area network transmission power control module 2936 control of transmission power of a signal transmitted to said base station includes using the second function 2938 which is different from the first function 2934 to determine the transmission power level of a signal transmitted to the base station based on the measured received power level of a signal from the base station.

For example, received base station signal N 2944 which was communicated in a base station downlink band is measured by measurement module 2926 obtaining signal N measurement information 2948 which is input to both peer to peer transmission power control module 2928 and WAN transmission power control module 2936. Peer to peer module 2928 uses first function 2934 to process input 2948 and obtains a determined maximum peer to peer transmission power level 2952, while WAN module 2936 processes the same input 2948 using the second function 2938 and obtains a determined maximum WAN transmission power level 2956 which is a higher level than the determined maximum peer to peer transmission power level 2952.

In various embodiments, the peer to peer transmission signal power level is at least 10 dBs below the transmission power level of the signal transmitted to the base station. For example, determined maximum peer to peer transmission power level 2952 is a least 10 dBs below determined maximum WAN transmission power level 2956 for the same value of measured base station signal. As another example, in some embodiments, if a wireless terminal is at a location and has determined peer to peer transmission power level information and WAN transmission power level information based on the same received base station signal measurement, the determined actual peer to peer transmission power level 2954 is at least 10 dBs below the determined actual WAN transmission power level 2958.

Data/information 2920 includes a plurality of received signals from a base station communicated in a base station downlink band which are measured and utilized in determining transmission power level information (received base station signal 1 2942, . . . , received base station signal N 2944), a plurality of corresponding signal measurement information (signal 1 measurement information 2946, . . . , signal N measurement information 2948), respectively. Data/information 2920 also includes peer to peer transmission authorization status information 2950 which indicates whether or not the wireless communications device 2900 is currently allowed to transmit peer to peer signals. Data/information 2920 also includes a determined maximum peer to peer transmission power level 2952 which is the output of sub-module 2930 and a determined actual peer to peer transmission power level 2954 which is the output of sub-module 2932.

Timing/frequency structure information 2960, included as part of data/information 2920, includes uplink frequency band information 2962, e.g., WAN uplink bandwidth information, WAN uplink carrier information and uplink WAN tone set information, downlink frequency band information 2964, e.g., WAN downlink bandwidth information, WAN downlink carrier information and downlink WAN tone set information, and information identifying the location of the measured base station signals 2966. In this exemplary embodiment peer to peer communications signaling uses a WAN uplink frequency band being used by a base station with the peer to peer signals acting as interference to the WAN uplink signals directed to the base station. The reference and/or control signal, which is received in a downlink frequency band by wireless communications device 2900, is measured, and the measurement is utilized to control wireless communications device peer to peer transmission power level in an uplink frequency band. Information 2966 identifies which WAN downlink band carries this signal, and in some embodiments, identifies more specific information corresponding to the signal, e.g., a point in a recurring timing structure and/or specific tone information used to identify the signal.

In various embodiments in which the wireless communications device 2900 supports WAN communications, e.g., cellular communications, data/information 2920 also includes determined maximum WAN transmission power level information 2956 and determined actual WAN transmission power level information 2958, which are outputs of WAN transmission power control module 2936.

Figure 7A:
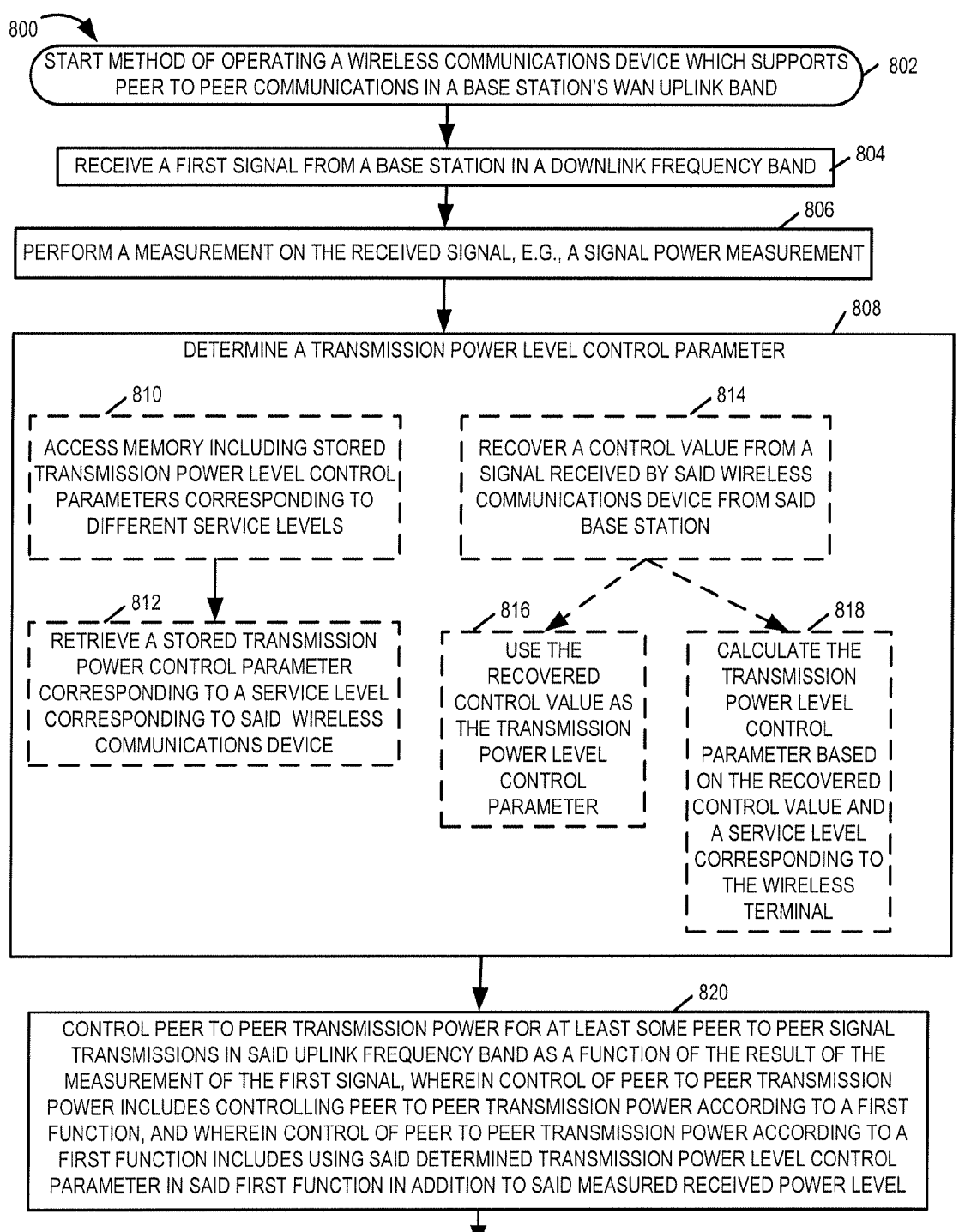
FIG. 7 comprising the combination of FIG. 7A
FIG. 7B is a flowchart of an exemplary method of operating a wireless communications device supporting peer to peer communications in accordance with various embodiments.
Figure 7B:
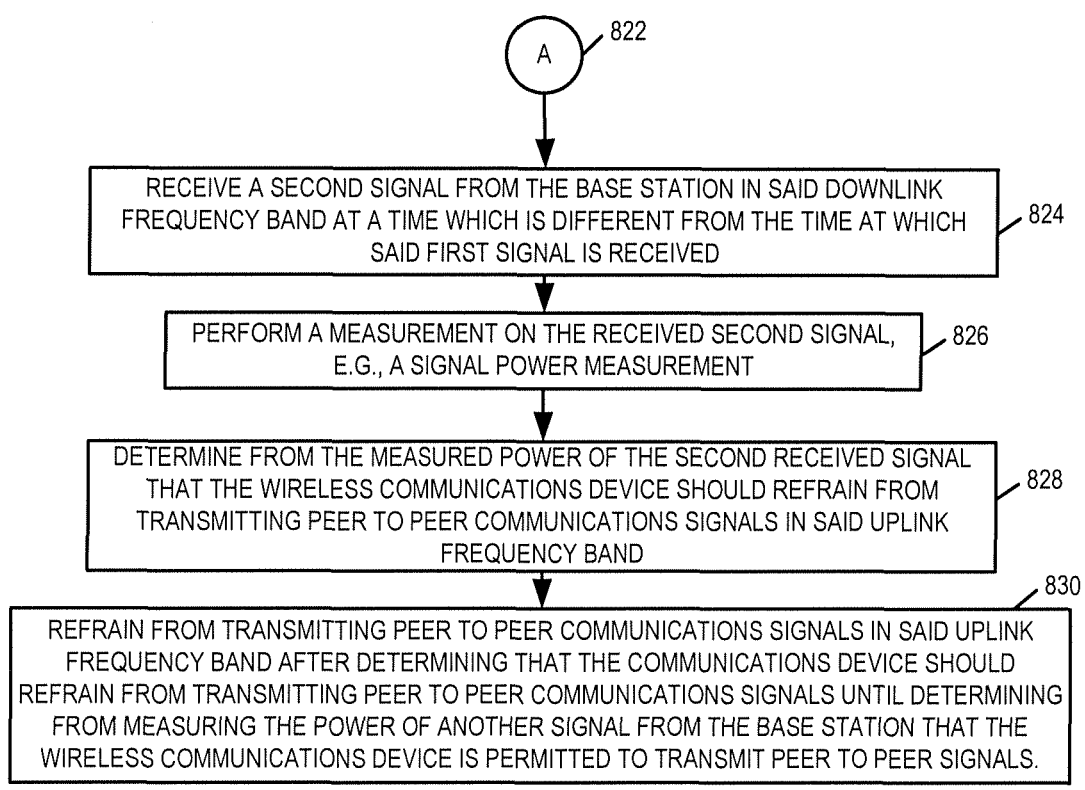

FIG. 7 comprising the combination of FIG. 7A and FIG. 7B is a flowchart 800 of an exemplary method of operating a wireless communications device supporting peer to peer communications in a base station's WAN uplink band in accordance with various embodiments. Operation starts in step 802, where the wireless communications device is powered on and initialized and proceeds to step 804, where the wireless communications device receives a first signal, e.g., a beacon signal or a non-beacon broadcast channel signal, from a base station in a base station downlink frequency band.

Operation proceeds from step 804 to step 806. In step 806, the wireless communications device performs a measurement on the received signal, e.g., a signal power measurement. Operation proceeds from step 806 to step 808.

In step 808 the wireless communications device determines a transmission power level control parameter. In one exemplary embodiment step 808 includes sub-steps 810 and 812. In another exemplary embodiment step 808 includes sub-step 814 and 816. In still another exemplary embodiment step 808 includes sub-steps 814 and 818.

In sub-step 810, the wireless communications device accesses memory, including stored transmission power level control parameters corresponding to different service levels, and then in sub-step 812 the wireless communications device retrieves a stored transmission power corresponding to a service level corresponding to said wireless communications device.

In sub-step 814, the wireless communications device recovers a control value from a signal received by said wireless communications device from said base station. In some embodiments, the signal from which the control value is recovered is the first signal which was received in a downlink frequency band in step 804. Operation proceeds from sub-step 814 to one of sub-steps 816 and 818. In sub-step 816, the wireless communications device uses the recovered control value as the transmission power level control parameter. Alternatively, in sub-step 818, the wireless communications device calculates the transmission power level control parameter based on the recovered control value and a service level corresponding to the wireless terminal.

Operation proceeds from step 808 to step 820. In step 820, the wireless communications device controls peer to peer transmission power for at least some peer to peer transmissions in said uplink frequency band as a function of the result of the measurement of the first signal, wherein control of peer to peer transmission power includes controlling peer to peer transmission power according to a first function, and wherein controlling peer to peer transmission power according to a first function includes using said determined transmission power level control parameter in said first function in addition to said measured received power level. Operation proceeds from step 820 via connecting node A 822 to step 824.

In step 824, the wireless communications device receives a second signal from the base station, e.g., a second beacon signal or a second non-beacon broadcast channel signal, in said downlink frequency band at a time which is different from the time at which said first signal is received. Then, in step 826, the wireless communications device performs a measurement of the received second signal, e.g., a power measurement of the received second signal. Operation proceeds from step 826 to step 828, in which the wireless communications device determines from the measured power of the second received signal that the wireless communications device should refrain from transmitting peer to peer communications signals in said uplink frequency band. Operation proceeds from step 828 to step 830. In step 830, the wireless communications device refrains from transmitting peer to peer communications signals in said uplink frequency band after determining that the communications device should refrain from transmitting peer to peer communications signals until determining from measuring the power of another signal from the base station that the wireless communications device is permitted to transmit peer to peer signals.

Figure 8:
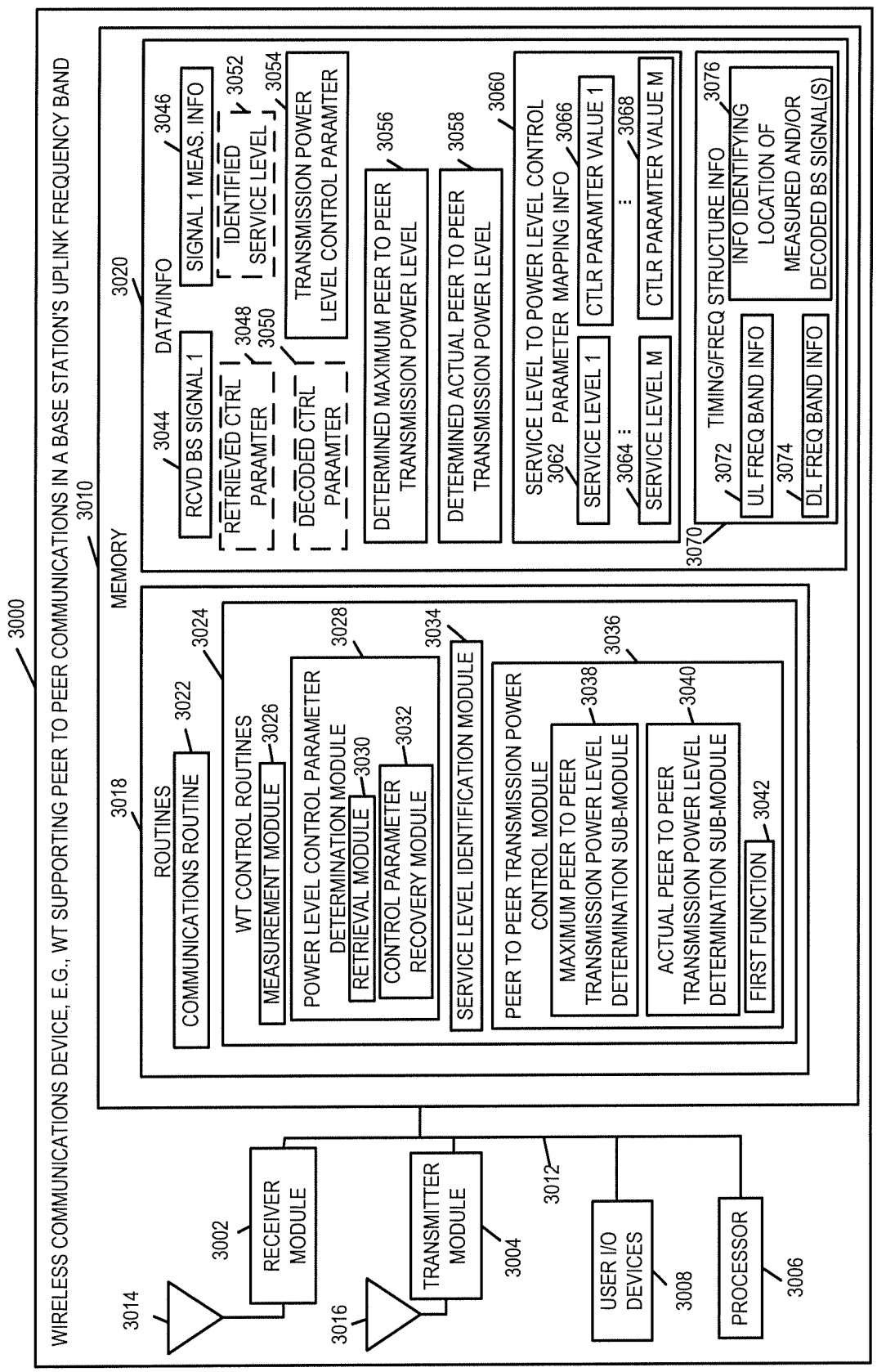
FIG. 8 is a drawing of an exemplary wireless communications device, e.g., wireless terminal such as a mobile node, supporting peer to peer communications in accordance with various embodiments.

FIG. 8 is a drawing of an exemplary wireless communications device 3000, e.g., wireless terminal such as a mobile node, supporting peer to peer communications in a base station's WAN uplink frequency band in accordance with various embodiments. Exemplary wireless communications device 3000 receives a signal, e.g., a beacon signal or non-beacon broadcast channel signal, from a base station in a base station downlink frequency band which it utilizes in determining whether or not it is permitted to transmit peer to peer signals into the base station's uplink band and/or in determining peer to peer transmission power level information, e.g., a maximum peer to peer transmission power level.

Wireless communications device 3000 includes a receiver module 3002, a transmitter module 3004, user I/O devices 3008, a processor 3006, and memory 3010 coupled together via a bus 3012 over which the various elements may interchange data and information. Memory 3010 includes routines 3018 and data/information 3020.

The processor 3006, e.g., a CPU, executes the routines 3018 and uses the data/information 3020 in memory 3010 to control the operation of the wireless communications device 3000 and implement methods, e.g., the method of flowchart 800 of FIG. 7.

Receiver module 3002, e.g., an OFDM receiver, is coupled to receive antenna 3014 via which the wireless communications device 3000 receives a signal from a base station, e.g., a beacon signal or non-beacon broadcast channel signal, said received signal used in determining peer to peer transmission power level information, said signal being received in a base station downlink frequency band. Receiver module 3002 also receives peer to peer communications signals in a base station's uplink frequency band. Transmitter module 3004, e.g., an OFDM transmitter, is coupled to transmit antenna 3016, via which the wireless communications device 3000 transmits peer to peer signals to other wireless communications devices.

User I/O devices 3008 include, e.g., microphone, keyboard, keypad, mouse, camera, switches, speaker, display, etc. User I/O devices 3008 allow a user of wireless communications device 3000 to input data/information, access output data/information, and control at least some functions of the wireless communications device 3000, e.g., attempt to initiate a peer to peer communications session.

Routines 3018 include a communications routine 3022 and wireless terminal control routines 3024. The communications routine 3022 implements the various communications protocols used by the wireless communications device 3000. Wireless terminal control routines 3024 include a measurement module 3026, a power level control parameter determination module 3028, a service level identification module 3034 and a peer to peer transmission power control module 3036.

Measurement module 3026 performs a measurement on a received signal from a base station which was received in a base station downlink frequency band. Received base station signal 1 3044 represents an input to measurement module 3026 while signal 1 measurement information 3046 represents an output of measurement module 3026. In various embodiments, the measurement of measurement module 3026 is a signal power measurement.

Power level control parameter determination module 3028 determines a transmission power level control parameter. In some embodiments, the power level control parameter determination module 3028 sets the transmission power level control parameter to the retrieved control parameter 3048. In some embodiments, the power level control parameter determination module 3028 determines the transmission power level control parameter as a function of the retrieved control parameter 3048. In some embodiments, the power level control parameter determination module 3028 sets the transmission power level control parameter to the recovered control parameter, e.g., decoded control parameter 3050. In some embodiments, the power level control parameter determination module 3028 determines the transmission power level control parameter as a function of the recovered control parameter, e.g., decoded control parameter 3050. In some embodiments, the power level control parameter determination module 3028 determines the transmission power level control parameter as a function of the identified service level 3052. In some embodiments, the power level control parameter determination module 3028 determines the transmission power level control parameter as a function of the retrieved control parameter 3048 and the recovered control parameter, e.g., decoded control parameter 3050. In some embodiments, the power level control parameter determination module 3028 determines the transmission power level control parameter by operations including one of: i) using the recovered value as the transmission power level control parameter and ii) calculating the transmission power control parameter based on the recovered control value and a service level corresponding to the wireless terminal.

Service level identification module 3034 identifies a current service level corresponding to the wireless communications device 3000. For example, some different users of communications device 3000, in some embodiments, correspond to different service levels, e.g., emergency users, government associated users, service provider users, tier 1 corporate users, tier 2 corporate users, tier 1 private users, tier 2 private users, etc. In other examples, different service levels can correspond to different types of communications devices, different types of data to be communicated, different amounts of data to be communicated and/or different latency considerations. The identified current service level is specified in identified service level 3052.

Power level control parameter determination module 3028 includes a retrieval module 3030 and a control parameter recovery module 3032. Retrieval module 3030 retrieves a stored transmission power level control parameter corresponding to a service level corresponding to the wireless communications device 3000. Thus retrieval module 3030 uses identified service level 3052 as input, accesses service level to power level control parameter mapping information 3060 and obtains the control parameter associated with the input service level. Retrieved control parameter 3048 is an output of retrieval module 3030.

Control parameter recovery module 3032 recovers a control value from a signal received by the communications device 3000 from a base station. In some embodiments, the control value is recovered from the same signal which is measured by measurement module 3026, e.g., received base station signal 1 3044. Decoded control parameter 3050 is an output of control parameter recovery module 3032. In some embodiments, the recovered control value is an interference level indicator value.

Peer to peer transmission power control module 3036 controls peer to peer transmission power for at least some peer to peer signal transmissions as a function of the result of a measurement of a received base station signal. Peer to peer transmission power control module 3036 includes a maximum peer to peer transmission power level determination sub-module 3038, an actual peer to peer transmission power level determination sub-module 3040 and a first function 3042.

Maximum peer to peer transmission power level sub-module 3038 uses the first function 3042 to determine a maximum peer to peer transmission power level. Actual peer to peer transmission power level sub-module 3040 determines an actual peer to peer signal transmission power level as a function of said maximum peer to peer transmission power level and a peer to peer signal received from a second peer to peer communications device. In various embodiments, sub-module 3040 controls the actual determined peer to peer transmission power level to be less than or equal to the maximum peer to peer transmission power level.

Peer to peer transmission power level control module 3036 uses a determined transmission power level control parameter 3054 in addition to a measured received power level, e.g., from signal 1 measurement information 3046 in determining a peer to peer transmission power level, e.g., in determining determined maximum peer to peer transmission power level 3056. In some embodiments, some or all of the functions of the power level control parameter determination module 3028 are included as part of the peer to peer transmission power control module 3036.

Data/information 3020 includes a received signal from a base station, received base station signal 1 3044 which was received in a base station downlink band, which is measured by measurement module 3026 obtaining signal 1 measurement information 3046 which is utilized in determining transmission power level information. Data/information 3020 also includes a transmission power level control parameter 3054, a determined maximum peer to peer transmission power level 3056, a determined actual peer to peer transmission power level 3058, service level to power level control parameter mapping information 3060, and timing frequency structure information 3070. In some embodiments data/information 3020 includes one or more of identified service level 3052, retrieved control parameter 3048 and decoded control parameter 3050.

Retrieved control parameter 3048 is an output of retrieval module 3030 and corresponds to one of the control parameter values (control parameter value 1 3066, ..., control parameter value M 3068) of service level to power control parameter mapping information 3060. Decoded control parameter 3050 is an output of control parameter recovery module 3032 and represents information recovered from a received base station signal. In some embodiments, the received base station signal from which the information is recovered is the same base station signal which is power measured, e.g., received base station signal 1 3044. In some embodiments, the recovered control value is an interference level indicator value.

Identified service level 3052 is an output of service level identification module 3034, and is used as input to retrieval module 3030. The identified service level 3052 is used to select a corresponding control parameter value. For example, if identified service level 3052 indicates service level M 3064, then retrieval module 3030 retrieves control parameter value M 3068 which is stored in retrieved control parameter 3048.

Transmission power level control parameter 3054 is an output of power level control parameter determination module 3028. Transmission power level control parameter 3054 is determined as a function of one or more of: identified service level 3052, a retrieved control parameter 3048 and a decoded control parameter 3050. Transmission power level control parameter 3054 is used as an input by peer to peer transmission power control module 3036.

Determined maximum peer to peer transmission power level 3056 is an output of maximum peer to peer transmission power level sub-module 3038, while determined actual peer to peer transmission power level 3058 is an output of actual peer to peer transmission power level determination sub-module 3040.

Service level to power level control parameter mapping information 3060 includes a plurality of service levels (service level 1 3062, ..., service level M 3064) and a plurality of corresponding control parameter values (control parameter value 1 3066, ..., control parameter value M 3068).

Timing/frequency structure information 3070, included as part of data/information 3020, includes uplink frequency band information 3072, e.g., WAN uplink bandwidth information, WAN uplink carrier information and uplink WAN tone set information, downlink frequency band information 3074, e.g., WAN downlink bandwidth information, WAN downlink carrier information and downlink WAN tone set information, and information identifying the location of the measured and/or decoded base station signals 3076. In this exemplary embodiment peer to peer communications signaling uses a WAN uplink frequency band being used by a base station with the peer to peer signals acting as interference to the WAN uplink signals directed to the base station. A signal which is received by wireless communications device 3000 in a base station WAN downlink frequency band is measured and the measurement utilized to control wireless communications device 3000 peer to peer transmission power level. In some embodiments a signal which is received by wireless communications device 3000 and decoded recovery information, e.g., recovering an interference indicator value, is also utilized to control wireless communications device 3000 peer to peer transmission power level. In some embodiments the same base station signal utilized for power measurement is the decoded signal from which the information is recovered. In some other embodiments, there are two different received signals from the base station, one signal whose received power level is measured and utilized and another signal conveying encoded power control information, e.g., an encoded interference indicator value. The base station signal from which information is recovered, e.g., an interference level indicator value, in some embodiments, is communicated in the WAN downlink band. Information 3076 identifies which WAN downlink band carries the measured base station signal and which WAN downlink band carries the base station signal used for information recovery. In some embodiments, information 3076 identifies more specific information corresponding to the signal or signals, e.g., a point in a recurring timing structure and/or specific tone information used to identify the signal or signals.

Figure 9:
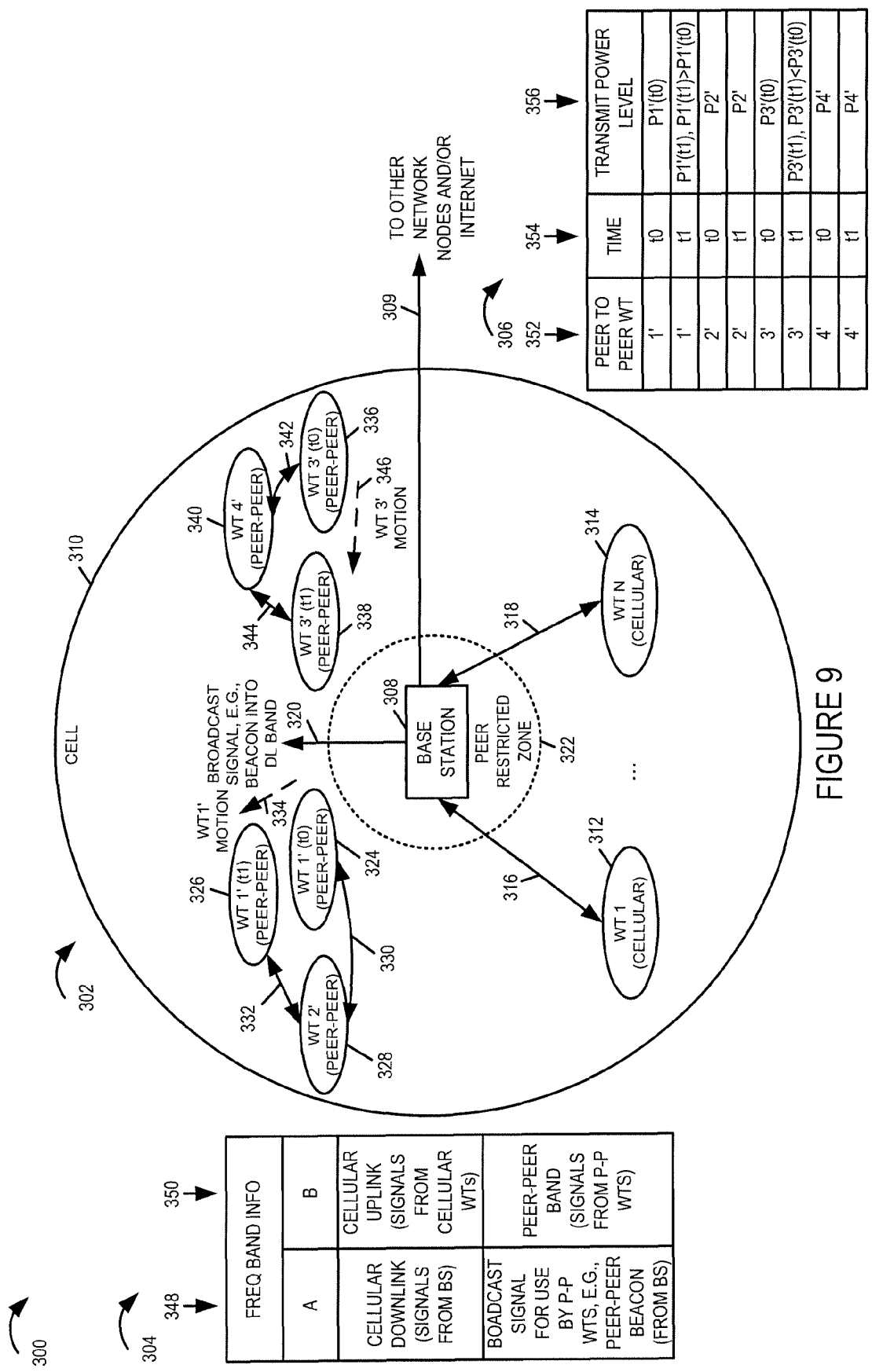
FIG. 9 is a drawing illustrating one exemplary embodiment including an exemplary communications system, a table describing frequency band usage information and a table illustrating exemplary peer to peer wireless terminal transmission power level information.

FIG. 9 is a drawing 300 illustrating one exemplary embodiment including a communications system 302, a table 304 describing frequency band usage information and a table 306 illustrating exemplary peer to peer wireless terminal transmission power level information. Exemplary communications system 302 includes a base station 308 with a corresponding cellular coverage area represented by cell 3 10. The base station 308 is coupled to other network nodes, e.g., other base stations, routers, AAA nodes, home agent nodes, control nodes, etc., and/or the Internet via network link 309, e.g., a fiber optic link. In communications system 302 there are also a plurality of wireless terminals supporting cellular communications (WT 1 312, . . . , WT N 314). Cellular WTs (312, 314) are coupled to base station 308 via wireless links (316, 318), respectively.

In communications system 302 there are also a plurality of wireless terminals supporting peer to peer communications (WT 1', WT 2' 328, WT 3', WT 4' 340). WT1' is shown at two points in time and is represented as element 324 at time t0 and as element 326 at time t1. WT 1' motion is indicated by arrow 334. WT3' is shown at two points in time and is represented as element 336 at time t0 and as element 338 at time t1. WT 3' motion is indicated by arrow 346. Peer to peer communications between WT1' and WT2' 328 are indicated by arrows 330 and 332. Peer to peer communications between WT3' and WT4' 340 are indicated by arrows 342 and 344.

The base station transmits a broadcast signal 320, e.g., a beacon signal or a non-beacon broadcast channel signal, into a downlink WAN frequency band of the base station. The broadcast signal, e.g., beacon signal, is detected and measured by the peer to peer wireless terminals. A power measurement of the received broadcast signal, e.g., beacon signal, is used by a peer to peer wireless terminal to determine whether the wireless terminal is allowed to transmit peer to peer signals into a corresponding WAN uplink frequency band and to control the transmission power level, e.g., the maximum transmission power level, when transmission is permitted into the corresponding uplink frequency band. Dotted arrow circle 322 around base station 308 indicates an exemplary peer to peer restricted region, where a peer to peer wireless terminal is restricted from transmitting signals. In the region close to the base station 308, transmissions from peer to peer wireless terminals at levels utilized in the peer to peer signaling can produce too much interference from the perspective of the base station receiver attempting to recover and decode uplink signals from wireless terminals operating in a cellular mode (312, . . . 314), and thus peer to peer wireless terminal transmissions are not permitted.

Frequency band information table 304 will now be described. First column 348 indicates that frequency band A is used as: (i) a cellular downlink band for signals transmitted from the base station intended to be received by cellular wireless terminals and (ii) for communicating a broadcast reference and/or control signal intended to be used by peer to peer wireless terminals, e.g., a beacon signal intended for control of peer to peer communications, e.g., power control of peer to peer communications in a corresponding uplink frequency band. Second column 350 indicates that frequency band B is used as: (i) a cellular uplink band for signals transmitted from cellular wireless terminals intended to be received by the base stations; and (ii) as a peer to peer band intended to be used for signals transmitted from and intended to be received by peer to peer wireless terminals.

Peer to peer wireless terminal power information table 306 will now be described. First column 352 identifies the exemplary peer to peer wireless terminals (WT 1', WT 2', WT 3', WT 4') being described. Second column 354 identifies points in time, either t0 or t1. Third column 356 identifies transmission power level information corresponding to the wireless terminal on the same row corresponding to the time indicated on the same row. The information of table 306 indicates that the transmission power level for WT1' increases from time t0 to time t1. It may be observed that WT1' moves away from the base station 308 during this time and that the measured power level of beacon signal 320 from WT1' s perspective can be expected to decrease during this time. It may also be observed that WT 1' remains outside the restricted zone 322 during this time. The information of table 306 also indicates that the transmission power level for WT3' decreases from time t0 to time t1. It may be observed that WT3' moves toward the base station 308 during this time and that the measured power level of beacon signal 320 from WT3' s perspective can be expected to increase during this time. It may also be observed that WT 3' remains outside the restricted zone 322 during this time. The power level described in table 306 can be a maximum allowable transmission power level for the wireless terminal. Alternatively, the power level described in table 306 can be an actual transmission power level.

In some embodiments, at least some wireless terminals support multiple modes of operation, e.g., a peer to peer and a cellular communications mode of operation.

Figure 10:
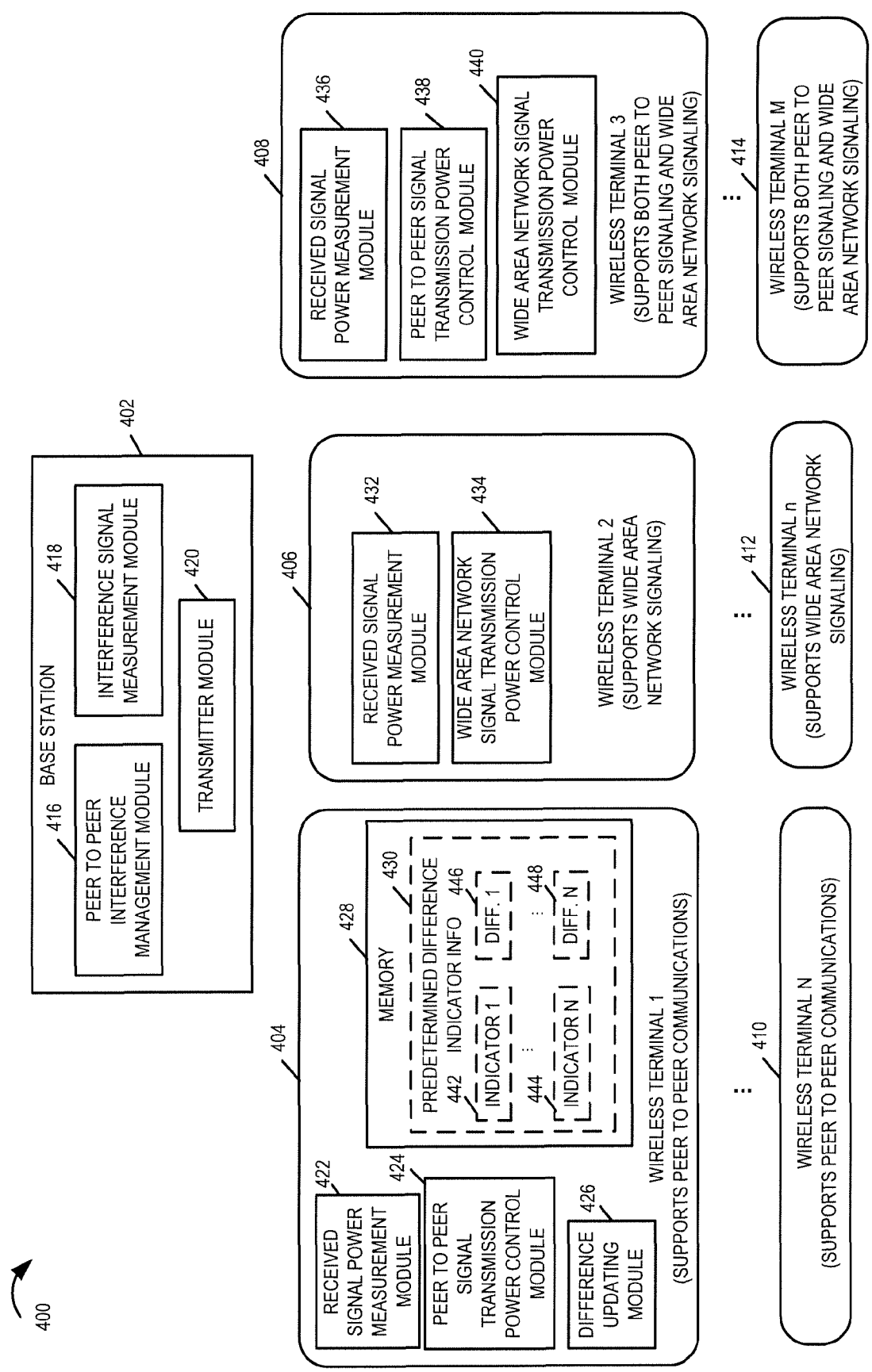
FIG. 10 is a drawing of an exemplary wireless communications system in accordance with various embodiments.

FIG. 10 is a drawing of an exemplary wireless communications system 400 in accordance with various embodiments. Exemplary wireless communications system 400 includes at least one base station 402, a plurality of wireless terminals supporting peer to peer communications (wireless terminal 1 404, . . . , wireless terminal N 410), a plurality of wireless terminals supporting wide area network signaling (wireless terminal 2 406, . . . , wireless terminal n 412), and a plurality of wireless terminals supporting both peer to peer signaling and wide area network signaling (wireless terminal 3 408, . . . , wireless terminal M 414).

Base station 402 includes a peer to peer interference management module 416, an interference signal measurement module 418, and a transmitter module 420. The peer to peer interference management module 416 determines a peer to peer transmission power level control value. Transmitter module 420 transmits the determined peer to peer transmission power level control value, e.g., as a communicated indicator value. Interference signal measurement module 418 measures signal interference during a null uplink transmission period and supplies the measured signal interference information to the peer to peer interference management module 416.

Wireless terminal 1 404 includes a received signal power measurement module 422, a peer to peer signal transmission power control module 424, a difference updating module 426 and memory 428. Memory 428, in some embodiments, includes stored predetermined difference indicator information 430. The stored predetermined difference indicator information 430 includes a plurality of indicators which can be signaled by a base station (indicator 1 442, . . . , indicator N 444) and corresponding difference values (difference 1 446, . . . , difference N 448), respectively.

Received signal power measurement module 422 measures the power of a signal received from a base station, e.g., from base station 402, the received signal being received in a base station downlink frequency band. Peer to peer signal transmission power control module 424 controls a peer to peer signal transmission power level in a base station uplink frequency band as a function of the measured power of the signal from the base station in accordance with a first function. In various embodiments, the peer to peer signal transmission power level is a maximum permitted peer to peer signal transmission power level. Difference updating module 426 receives a difference indicator value from a base station, e.g., base station 402 and updates the first function based on the received indicator value. In some embodiments, the difference is a predetermined amount and memory 428, which stores indicators and corresponding predetermined differences, is accessed and the accessed value used by the first function.

Wireless terminal 2 406 includes a received signal power measurement module 432, and a wide area network signal transmission power control module 434. Received signal power measurement module 432 measures the power level of signals received from a base station, e.g., base station 402, in a downlink frequency band. Wide area network signal transmission power control module 434 controls wide area signal transmission power level into a base station uplink frequency band with respect to wireless terminal 2 406 as a function of the measured power of a signal received from the base station in a base station downlink frequency band in accordance with a second function, the second function being different than the first function. In some embodiments the wide area signal transmission power level is a maximum wide area signal transmission power level. In various embodiments, the second function determines a higher transmission power level than the first function for a given value of the measured received signal power. In some such embodiments, the difference in dBs between the transmission power determined by the first and second function for a given value of the measured received signal power is at least 10 dBs.

Wireless terminal 3 408 includes a received signal power measurement module 436, a peer to peer signal transmission power control module 438, and a wide area network signal transmission power control module 440. Received signal power measurement module 436 measures the power level of a signal received from a base station, in a downlink frequency band. Peer to peer signal transmission power control module 438 controls a peer to peer signal transmission power level in a base station uplink frequency band as a function of the measured power of the signal from a base station in accordance with a first function. Wide area network signal transmission power control module 440 controls wide area signal transmission power level in a base station uplink frequency band as a function of the measured power of a signal from the base station in accordance with a second function, said second function being different from said first function. In various embodiments, the second function used by module 440 determines a higher transmission power level than the first function used by module 438 for a given value of the measured received signal power. In some such embodiments, the difference in dBs between the transmission power determined by the first and second function for a given value of the measured received signal power is at least 10 dBs. In some embodiments, the first function used by module 438 of WT 3 408 is the same as the first function used by module 424 of WT 1 404. In some embodiments, the second function used by module 440 of WT 3 408 is the same as the second function used by module 434 of WT 2 406.

Figure 11:
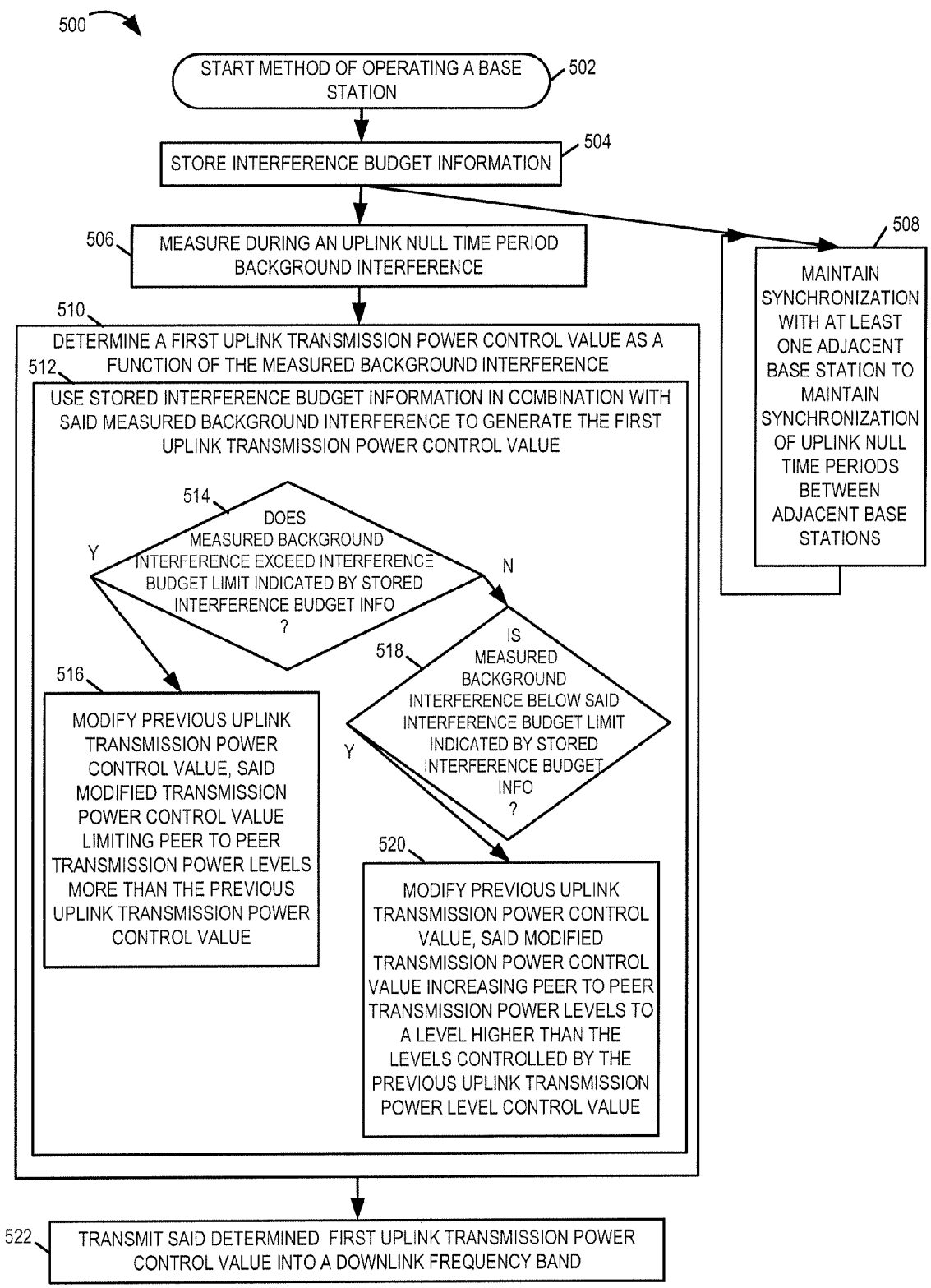
FIG. 11 is a flowchart of an exemplary method of operating a base station in accordance with various embodiments.

FIG. 11 is a flowchart 500 of an exemplary method of operating a base station in accordance with various embodiments. Operation of the exemplary method starts in step 502 and proceeds to step 504. In step 504, the base station stores interference budget information. Operation proceeds from step 504 to steps 506 and step 508.

In step 508, which is performed on an ongoing basis, the base station is operated to maintain synchronization with at least one adjacent base station to maintain synchronization of uplink null time periods between adjacent base stations. In various embodiments, an uplink null time period is a period of time in which at least a fraction of uplink bandwidth used by the base station is intentionally not used for transmitting uplink signals to the base station.

Returning to step 506, in step 506, the base station measures during an uplink null time period background interference. Then, in step 510, the base station determines a first uplink transmission power control value as a function of the measured background interference. Step 510 includes sub-step 512. In sub-step 512, the base station uses the stored interference budget information in combination with said measured background interference to generate the first uplink transmission power control value. Sub-step 512 includes sub-steps 514, 516, 518, and 520. In sub-step 514, the base station determines if the measured background interference exceeds an interference budget limit indicated by the stored interference budget information. If the budget limit is exceeded, then operation proceeds from sub-step 514 to sub-step 516; otherwise operation proceeds from sub-step 514 to sub-step 518.

In sub-step 516, the base station modifies a previous uplink transmission power control value, said modified transmission power control value limiting peer to peer transmission power levels more than the previous uplink transmission power control value. Returning to sub-step 518, in sub-step 518, the base station determines if the measured background interference is below said interference budget limit indicated by stored interference budget information, e.g., lower by at least a predetermined threshold value. If it is determined in sub-step 518, that the measured background interference is below the interference budget limit such as to satisfy the test criteria, then operation proceeds from sub-step 518 to sub-step 520. In sub-step 520, the base station modifies the previous uplink transmission power control value, said modified transmission power control value increasing peer to peer transmission power levels to a level higher than the levels controlled by the previous transmission power control value.

Operation proceeds from step 510 to step 522, in which the base station transmits said determined first uplink transmission power control value into a downlink frequency band.

Figure 12:
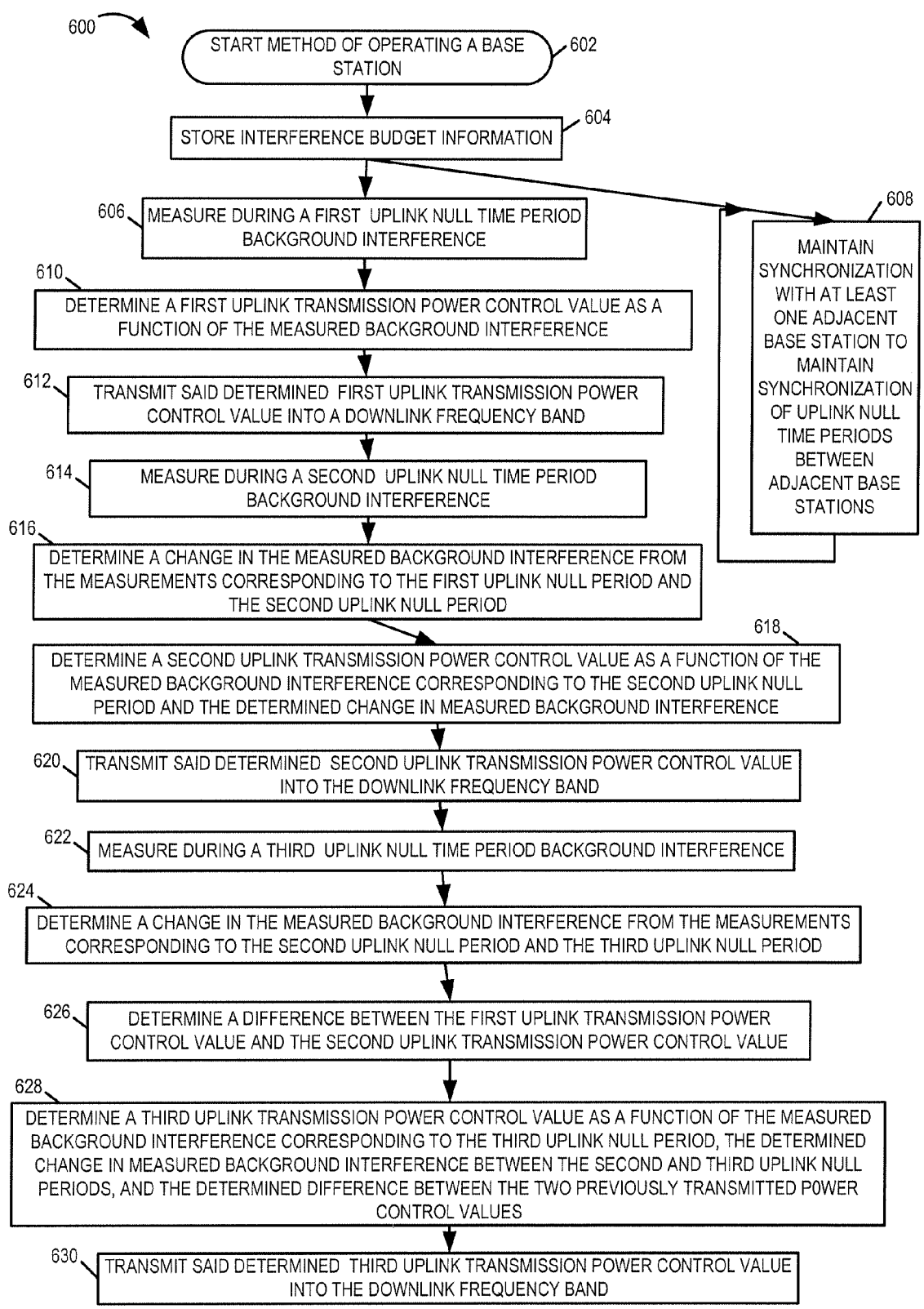
FIG. 12 is a flowchart of an exemplary method of operating a base station in accordance with various embodiments.

FIG. 12 is a flowchart 600 of an exemplary method of operating a base station in accordance with various embodiments. Operation of the exemplary method starts in step 602 and proceeds to step 604. In step 604, the base station stores interference budget information. Operation proceeds from step 604 to steps 606 and step 608.

In step 608, which is performed on an ongoing basis, the base station is operated to maintain synchronization with at least one adjacent base station to maintain synchronization of uplink null time periods between adjacent base stations. In various embodiments, an uplink null time period is a period of time in which at least a fraction of uplink bandwidth used by the base station is intentionally not used for transmitting uplink signals to the base station.

Returning to step 606, in step 606, the base station measures during a first uplink null time period background interference. Then, in step 610, the base station determines a first uplink transmission power control value as a function of the measured background interference. Operation proceeds from step 610 to step 612. In step 612, the base station transmits said determined first uplink transmission power control value into a downlink frequency band. Operation proceeds from step 612 to step 614.

In step 614, the base station measures during a second uplink null time period background interference, and then in step 616, the base station determines a change in the measured background interference from the measurements corresponding to the first uplink null period and the second uplink null period. Operation proceeds from step 616 to step 618.

In step 618, the base station determines a second uplink transmission power control value as a function of the measured background interference corresponding to the second uplink null period and the determined change in measured background interference, and then in step 620, the base station transmits the determined second uplink transmission power control value into the downlink frequency band. Operation proceeds from step 620 to step 622.

In step 622, the base station measures, during a third uplink null period, background interference, and in step 624 the base station determines a change in the measured background interference from the measurements corresponding to the second uplink null period and the third uplink null period. Operation proceeds from step 624 to step 626, in which the base station determines a difference between the first uplink transmission power control value and the second uplink transmission power control value. Operation proceeds from step 626 to step 628.

In step 628, the base station determines a third uplink transmission power control value as a function of the measured background interference corresponding to the third uplink null period, the determined change in measured background interference between the second and third uplink null periods, and the determined difference between the two previously transmitted power control values. Operation proceeds from step 628 to step 630, in which the base station transmits the determined third uplink transmission power control value into the downlink frequency band.

Figure 13:
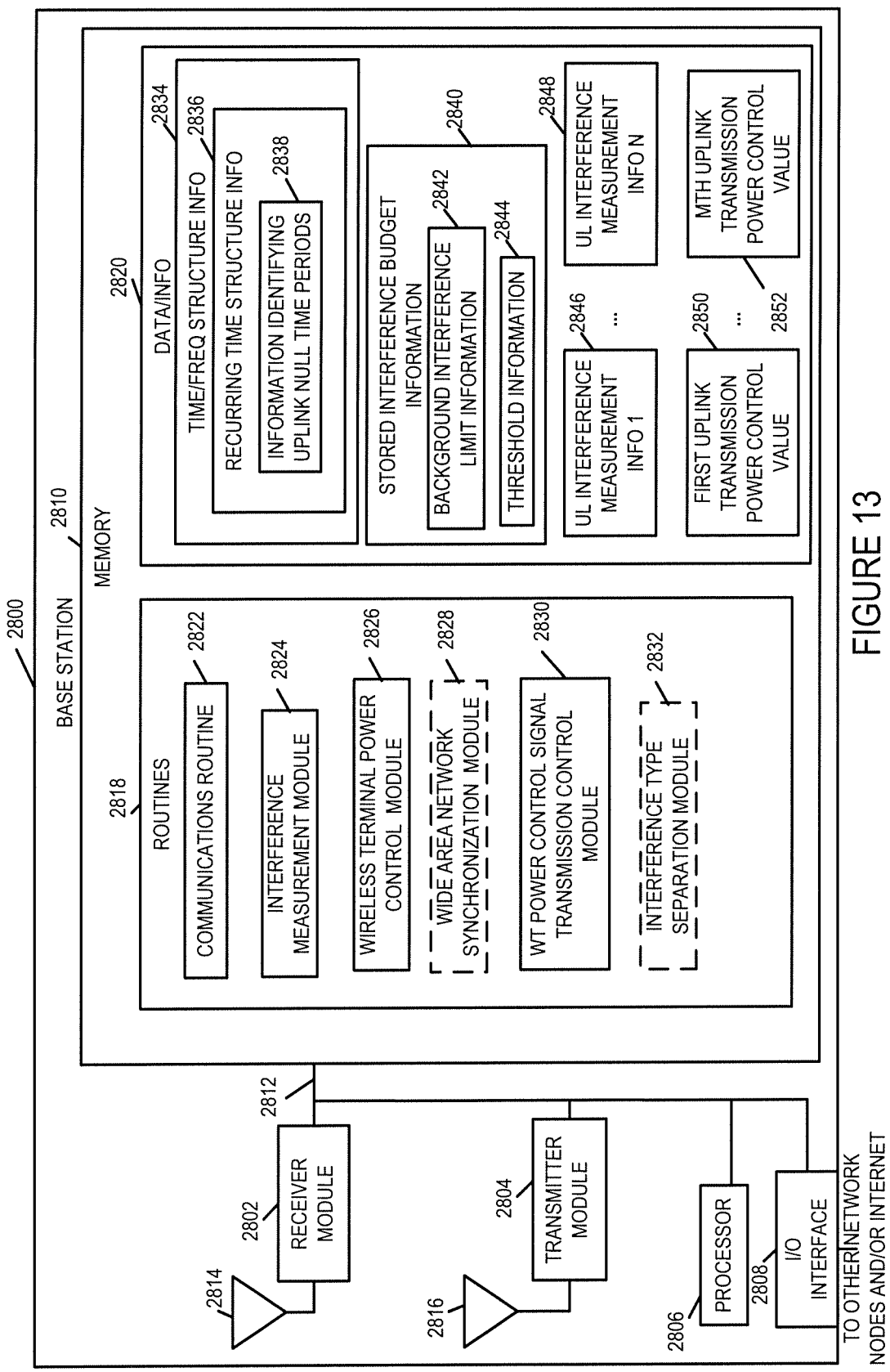
FIG. 13 is a drawing of an exemplary base station in accordance with various embodiments.

FIG. 13 is a drawing of an exemplary base station 2800 in accordance with various embodiments. Exemplary base station 2800 manages reception interference from peer to peer wireless terminals transmitting into the same air link resources used for its wide area network uplink communications. Exemplary base station 2800 determines and transmits into a downlink frequency band an uplink power control signal utilized by peer to peer wireless terminals in determining their transmission power level. In some embodiments, the uplink power control signal transmitted into the downlink frequency band by the base station 2800 is also utilized by wireless terminals, using the base station as a point of network attachment and transmitting uplink signals to the base station, to control transmission power levels.

Exemplary base station 2800 includes a receiver module 2802, a transmitter module 2804, a processor 2806, an I/O interface 2808, and a memory 2810 coupled together via a bus 2812 over which the various elements may interchange data and information.

Receiver module 2802, e.g., an OFDM receiver, is coupled to receive antenna 2814 via which the base station 2800 receives uplink signals from wireless terminals, e.g., wireless terminals functioning in a cellular mode and using the base station 2800 as a point of network attachment. Receiver module 2802 also receives interference from peer to peer communications devices operating in the local vicinity. In some embodiments, receiver module 2802 also receives interference from uplink signaling from cellular devices in adjacent cells.

Transmitter module 2804, e.g., an OFDM transmitter, is coupled to transmit antenna 2816, via which the base station 2800 transmits downlink signals to wireless terminals using base station 2800 as a point of network attachment. Transmitter module 2804 also transmits, into a base station downlink band, uplink transmission power control value signals to be used by peer to peer wireless terminals to control their transmission power level, the peer to peer wireless terminals using the base station's uplink band for peer to peer signaling and thus producing interference from the perspective of the base station receiver module 2802.

Memory 2810 includes routines 2818 and data/information 2820. The processor 2806, e.g., a CPU, executes the routines 2818 and uses the data/information 2820 in memory 2810 to control the operation of the base station 2800 and implement methods. Routines 2818 include a communications routine 2822, an interference measurement module 2824, a wireless terminal power control module 2826, and a wireless terminal power control signal transmission module 2830. In some embodiments, routines 2818 include one or more of wide area network synchronization module 2828 and interference type separation module 2832.

Communications routine 2822 implements various communications protocols used by the base station 2800. Interference measurement module 2824 measures during uplink null time periods background interference. Wireless terminal power control module 2826 determines uplink transmission power control values as a function of measured background interference. In various embodiments, the wireless terminal power control module 2826 determines an uplink power control value using stored interference budget information in combination with the measured background interference to generate the uplink transmission power control value. Wireless terminal power control signal transmission control module 2830 controls the transmitter module 2804 to transmit a generated uplink transmission power control signal, e.g., first uplink transmission power control value 2850. In some embodiments, the control module 2830 controls the transmitter module 2804 to transmit, into a base station downlink frequency band, a generated uplink transmission power control value in accordance with a recurring schedule. In some embodiments, the control module 2830 controls transmission as a function of interference level information. In some embodiments, wireless terminal power control module 2826 determines an uplink transmission power control value as a function of the measured background interference and a change in the measured background interference from a previous measurement. In some embodiments, the wireless terminal power control module 2826 determines an uplink transmission power control value as a function of the difference between two previously transmitted power control values.

In some embodiments, the wireless terminal power control module 2826 determines an uplink transmission power control value by operations including modifying a previous uplink transmission power control value when the measured background interference exceeds an interference budget limit indicated by the stored interference budget information, the modified transmission power control value limiting peer to peer transmission power levels more than the previous uplink transmission power control value. In some embodiments, the wireless terminal power control module 2826 determines an uplink transmission power control value by operations including modifying a previous uplink transmission power control value when the measured background interference is below an interference budget limit indicated by the stored interference budget information, the modified transmission power control value increasing peer to peer transmission power levels more than the previous uplink transmission power control value. In various embodiments, the changing to a higher level is performed when said measured interference is below said interference budget limit by at least a predetermined threshold.

Thus the value of the uplink transmission power control value is used by base station 2800 to regulate the transmission power level of peer to peer communications, thereby impacting interference to uplink signals being directed to base station 2800 in a base station uplink frequency band.

Wide area network synchronization module 2828 is used for maintaining synchronization with at least one adjacent base station to maintain synchronization of uplink null time periods between adjacent base stations.

Interference type separation module 2832 is used to obtain an estimate of the amount of uplink interference contribution sourced from peer to peer communications. In some embodiments, the interference type separation module 2832 intentionally inputs a controlled change level in the uplink transmission power control value and calculates an observed effect in the interference measurement during a subsequent uplink null period as part of separating the peer to peer interference from other interference sources, e.g., cellular communications devices transmitting uplink signals in an adjacent cell which is not synchronized with respect to base station 2800.

Data/information 2820 includes time/frequency structure information 2834, stored interference budget information 2840, a plurality of sets of interference measurement information (uplink interference measurement information 1 2846, . . . , uplink interference measurement information N 2848), and a plurality of generated uplink transmission power control values (first uplink transmission power control value 2850, . . . , Mth uplink transmission power control value 2852).

Timing/frequency structure information 2834 includes recurring time structure information 2836. The recurring time structure information 2836 includes information identifying uplink null time periods 2838. In some embodiments, an uplink null time period corresponds to a period of time in which at least a fraction of uplink bandwidth used by said base station is intentionally not used for transmitting uplink signals to the base station. In some embodiments, an uplink null time period is a time period during which wireless terminals, e.g., cellular communications devices, using the base station 2800 attachment point intentionally refrain from sending uplink signals to the base station 2800. During this time period peer to peer wireless terminal signaling continues using the uplink frequency band. Thus, the base station 2800 can measure background interference during this period. If adjacent base stations are synchronized such that uplink null periods are concurrent, then the measured noise during these periods can be associated with peer to peer signaling. However, if adjacent base stations are not synchronized, and the same uplink band is used, then the measured interference during such an uplink null period includes interference from both peer to peer wireless terminals and cellular communications devices corresponding to adjacent base stations.

Stored interference budget information 2840 includes background interference limit information 2842 and threshold information 2844.

Figure 14:
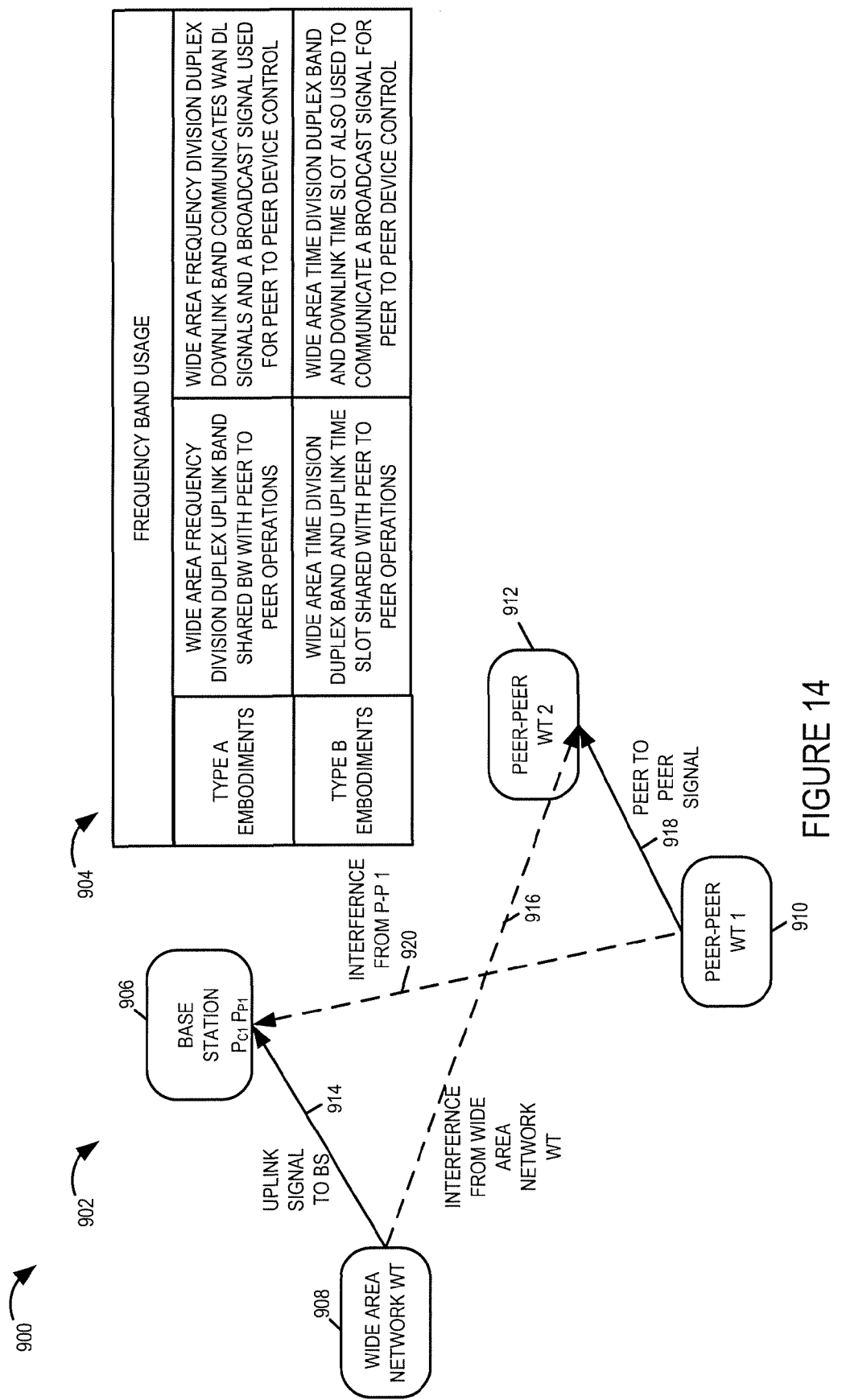
FIG. 14 is a drawing including an exemplary communications system and a frequency band usage table in accordance with various embodiments.

FIG. 14 is a drawing 900 including an exemplary communications system 902 and a frequency band usage table 904 in accordance with various embodiments. In the exemplary communications system 900 a wide area network shares bandwidth with peer to peer communications. In various embodiments, the wide area network corresponds to a deployed system and the peer to peer capabilities involve add on and/or upgrade features. In some embodiments, the exemplary communications system 902 is initially deployed including both WAN and peer to peer capabilities. Frequency band usage table 904 indicates two types of embodiments which can correspond to exemplary system 902. In the first type of embodiment, type A embodiments, the wide area network uses frequency division duplex (FDD), the wide area frequency division duplex uplink band shares bandwidth with peer to peer communications activities, and the WAN FDD downlink band communicates WAN downlink signals and a broadcast signal used for peer to peer device control. In the second type of embodiment, type B embodiments, the wide area network uses time division duplex (TDD) with the same frequency band being used for uplink and downlink with respect to the WAN signaling, the wide area band shares an uplink time slot with peer to peer communications activities, and the wide area network shares a downlink time slot to communicate a broadcast signal for peer to peer device control. Thus, in both types of embodiments, uplink signaling from the wide area network communications devices can interfere with reception of peer to peer communications signals by a peer to peer communications device, and the peer to peer communications signals directed between peer to peer communications devices can interfere with the reception of wide area network uplink signals at the base station. In addition, the control signal transmitted from the base station intended to be used by peer to peer devices is communicated using resources typically reserved for downlink WAN signaling.

Exemplary communications system 902 includes a base station 906, a wide area network wireless terminal 908, e.g., a cellular mobile node, a first peer to peer wireless terminal 910, and a second peer to peer wireless terminal 912. For the purposes of illustration consider that wide area network wireless terminal 908 transmits uplink signal 914 to base station 906. Base station 906 receives this signal and measures the received signal as $P_{C1}$. The signal 914 from the perspective of peer to peer wireless terminal 2 912 is viewed as interference 916 from the wide area network wireless terminal 908. Now consider that the first peer to peer wireless terminal 910 transmits peer to peer signal 918 to peer to peer wireless terminal 2 912. The signal 918 from the perspective of base station 906 is viewed as interference 920 from first peer to peer wireless terminal 910. Base station 906 receives this interference and measures the received signal as $P_{P1}$.

In accordance with various embodiments, priority is given to the wide area system, and interference is managed at the base station. For example, a power control value α is chosen to achieve a goal such as $(P_{P1}/P_{C1}) \leq \alpha$. In some such embodiments a is a value such as −10 dB, −20 dB, or −30 dBs. Although described in the example, with respect to one peer to peer wireless terminal causing interference with respect to base station reception corresponding to one wide area network's wireless terminal uplink signaling, it is to be understood that there may be, and sometimes are, a plurality of peer to peer wireless terminals transmitting and contributing to the interference, and there may be, and sometimes are, a plurality of wide area network wireless terminals transmitting uplink signals to the base station, which the base station is attempting to recover. Thus, the control factor α, determined by the base station to manage interference can be, and sometimes is, dependent upon multiple users. In some embodiments, the control factor α depends on the number of users, e.g., the number of active wide area network users and/or the number of active peer to peer users.

Figure 15:
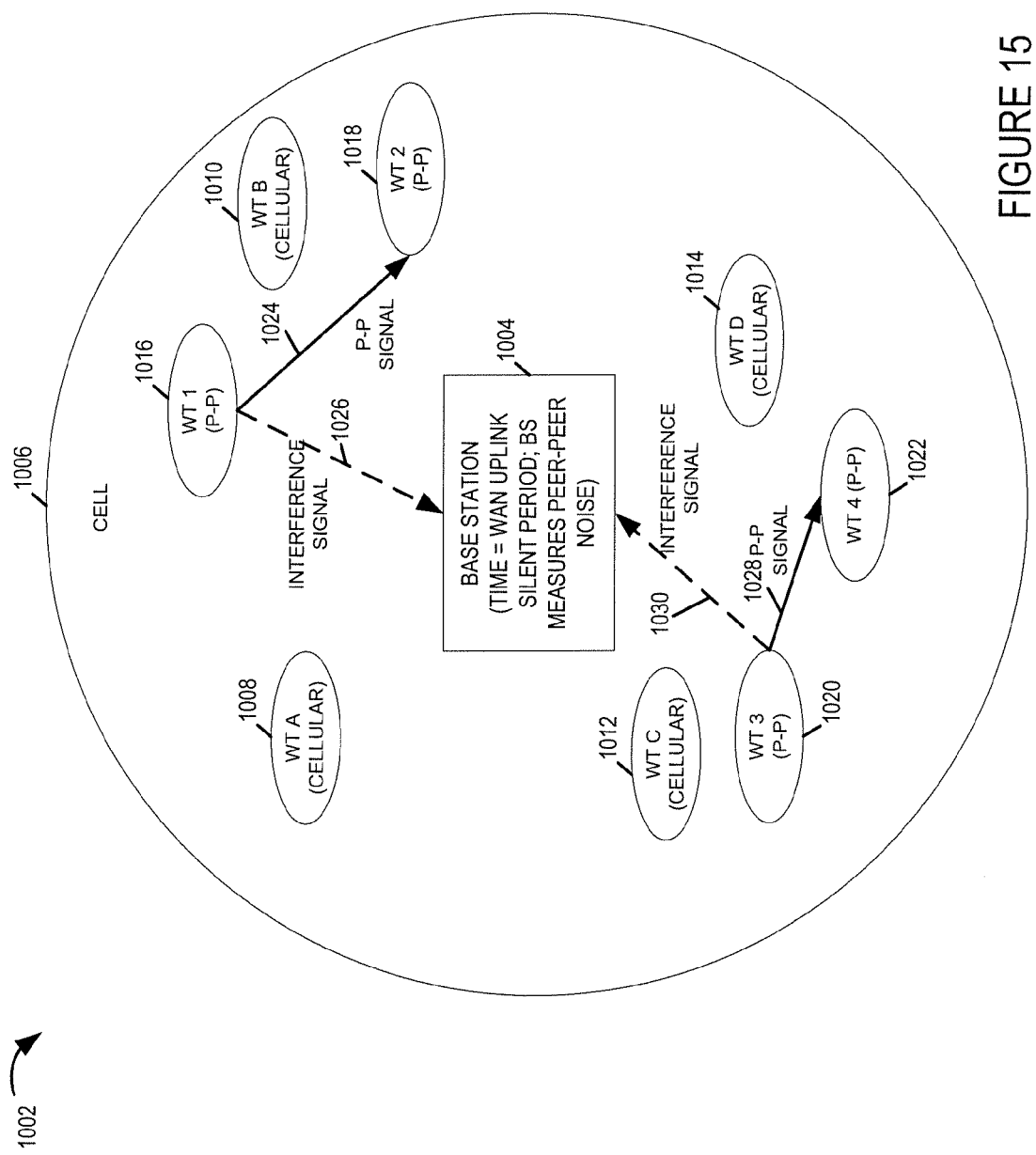
FIG. 15 is a drawing illustrating a feature of various embodiments, in which a wide area network has a silent period in which the base station monitors for and measures peer to peer noise.

FIG. 15 is a drawing 1002 illustrating a feature of various embodiments, in which a wide area network has a silent period in which the base station monitors for and measures peer to peer noise. Exemplary drawing 1002 includes a base station 1004 having a corresponding cellular coverage area 1006. In some embodiments the cellular coverage area has a radius of at least 1 kilometer. Within the cell, there is a plurality of wireless terminals functioning in a cellular mode of operation (WT A 1008, WT B 1010, WT C 1012, WT D 1014). These wireless terminals (1008, 1010, 1012, 1014) receive downlink signals from base station 1004 and transmit uplink signals to base station 1004. However, this point in time corresponds to an intentional wide area network uplink silent period where the wide area network wireless terminals (1008, 1010, 1012, 1014) do not transmit any uplink signals.

The cell 1006 also includes a plurality of wireless terminals functioning in the peer to peer mode of operation (WT 1 1016, WT 2 1018, WT 3 1020, WT 4 1022). Peer to peer communications are not restricted during this time period. Peer to peer WT 1 1016 happens to be transmitting a peer to peer signal 1024 to peer to peer wireless terminal 2 1018. This transmitted peer to peer signal 1024 is viewed as peer to peer noise interference signal 1026 from the perspective of the receiver in base station 1004. Peer to peer WT 3 1020 happens to be transmitting a peer to peer signal 1028 to peer to peer wireless terminal 4 1022. This transmitted peer to peer signal 1028 is viewed as peer to peer noise interference signal 1030 from the perspective of the receiver in base station 1004.

Figure 16:
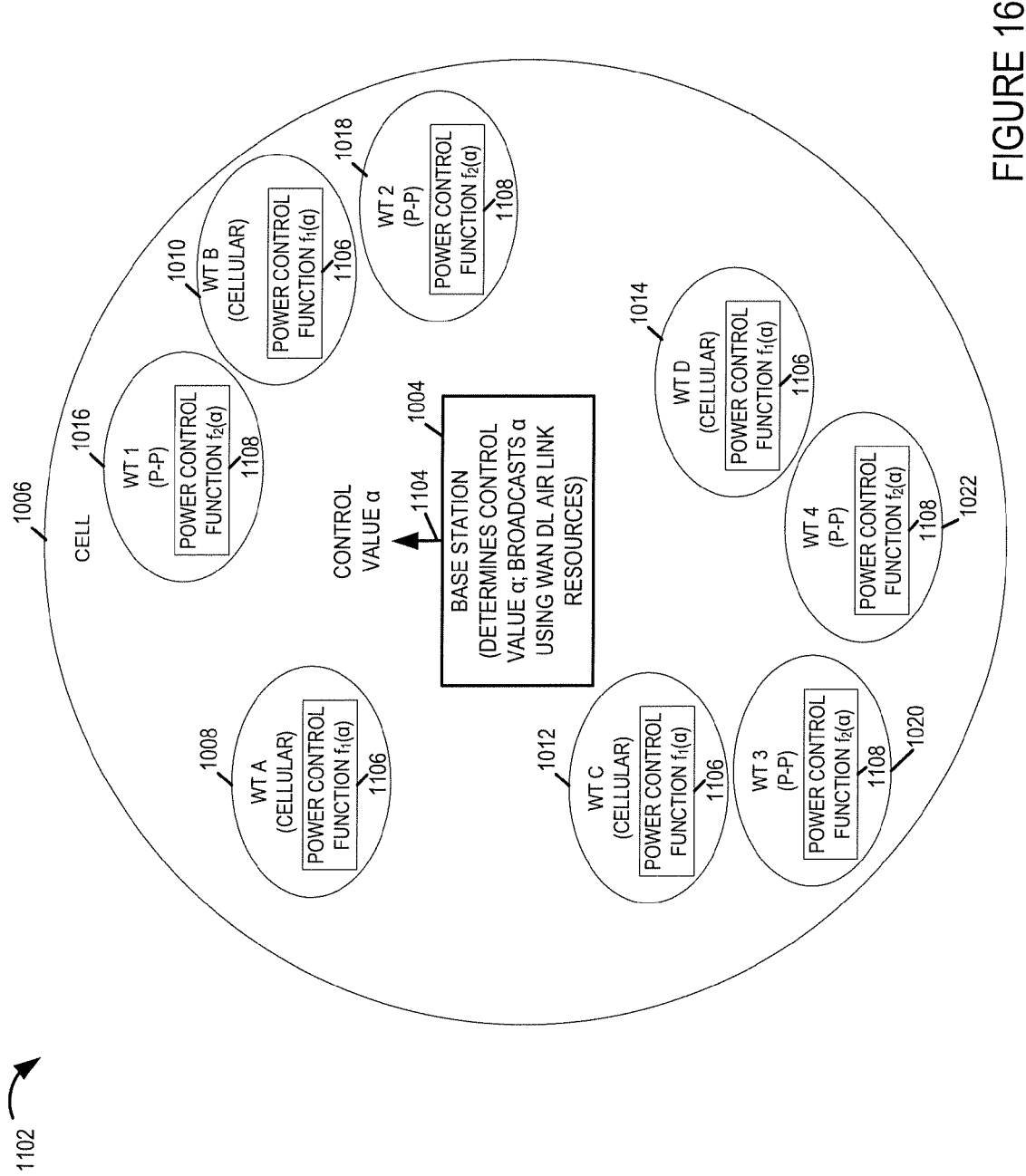
FIG. 16 is a drawing illustrating several features of various embodiments, and is a continuation of the example of FIG. 15.

FIG. 16 is a drawing 1102 illustrating several features of various embodiments, and is a continuation of the example of FIG. 15. In cell 1006, the base station 1004 determines a power control value α as a function of the measured peer to peer interference. The base station then broadcasts, using WAN downlink air link resources, this control value α via signal 1104 to be used by the wireless terminals. In this exemplary embodiment, the base station broadcasts a single value for control value α; however, the value α can be, and sometimes is, used differently by the different wireless communications devices receiving the broadcast signal 1104. In this example, the set of wireless terminals operating in the cellular mode (WT A 1008, WT B 1010, WT C 1012, WT D 1014) uses a first power control function, $f_1(\alpha)$ 1106, to determine a transmission power level control parameter; while the set of wireless terminals operating in the peer to peer mode (WT 1 1016, WT 2 1018, WT 3 1020, WT 4 1022) use a second power control function, $f_2(\alpha)$ 1108, to determine a transmission power control parameter.

Figure 17:
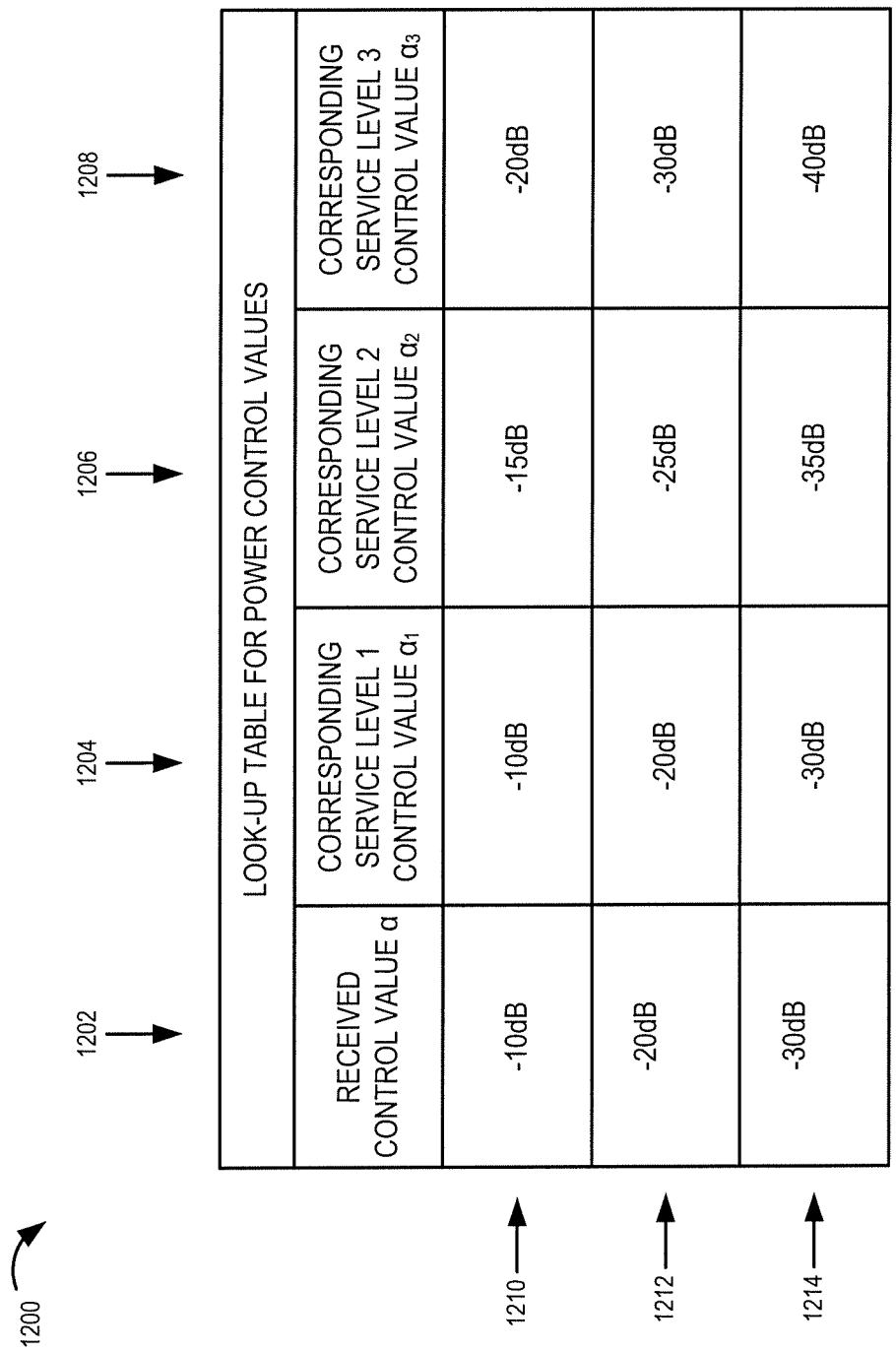
FIG. 17 is a drawing of an exemplary look-up table for control values illustrating a feature of various embodiments.

FIG. 17 is a drawing of an exemplary look-up table for control values 1200 illustrating a feature of various embodiments. In some embodiments, a wireless terminal receives a broadcast power control value from a base station in a downlink frequency band and determines its own power control value to use as a function of the received value and a corresponding service level. Different service levels may, and sometimes do, correspond to different traffic types, different types of services, and/or to different users of the service, and map to different service levels. For example, exemplary different priorities, in some embodiments, are associated with different traffic types, e.g., voice, latency critical data, and best effort type data. Exemplary different types of service include, e.g., emergency communications services and ordinary communications. Different types of users include, e.g., high priority users such as police, fire, emergency services, medium priority users having subscribed to a high service level plan, and low priority users having subscribed to a low service level plan. Thus in some embodiments, a recovered power control value is modified as a function of priority level.

In exemplary table 1200, first column 1202 indicates exemplary received control values α, second column 1204 indicates exemplary corresponding service level 1 control values $\alpha_1$, third column 1206 indicates exemplary corresponding service level 2 control values $\alpha_2$, and fourth column 1208 indicates exemplary corresponding service level 3 control values $\alpha_3$. First row 1210 indicates that if a wireless terminal using look-up table 1200 receives a broadcast power control value from a base station which indicates −10 dB and its corresponding service level is (service level 1, service level 2, service level 3), then it uses (−10 dB, −15 dB, −20 dB), respectively, for its power control value. Second row 1212 indicates that if a wireless terminal using look-up table 1200 receives a broadcast power control value from a base station which indicates −20 dB and its corresponding service level is (service level 1, service level 2, service level 3), then it uses (−20 dB, −25 dB, −30 dB), respectively, for its power control value. Third row 1214 indicates that if a wireless terminal using look-up table 1200 receives a broadcast power control value from a base station which indicates −30 dB and its corresponding service level is (service level 1, service level 2, service level 3), then it uses (−30 dB, −35 dB, −40 dB), respectively, for its power control value.

Figure 18:
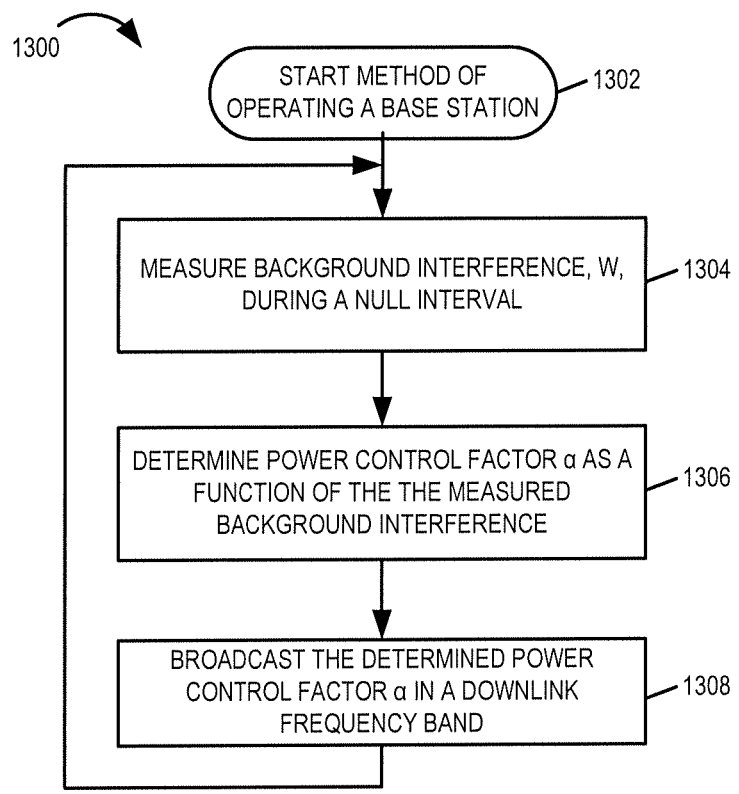
FIG. 18 is a flowchart of an exemplary method of operating a base station in accordance with various embodiments, e.g., a base station in which its uplink bandwidth is also utilized for peer to peer signaling.

FIG. 18 is a flowchart 1300 of an exemplary method of operating a base station in accordance with various embodiments, e.g., a base station in which its uplink bandwidth is also utilized for peer to peer signaling. The base station is, e.g., a base station, operating as part of a cellular communications system in which operations are synchronized between adjacent base stations. Synchronization between adjacent base stations facilitates the implementation of universal uplink null periods, in which wide area network wireless terminal cell uplink signaling can be controlled to universally stop. These null periods are utilized for the measurement of background interference. In such an embodiment, the background interference W can be approximated by W=thermal noise+peer to peer noise. The base station desires to control interference, and determines and broadcasts, into a downlink frequency band, a power control factor α, to be received by the wireless terminals in its vicinity.

Operation starts in step 1302, where the base station is powered on and initialized. In some embodiments, the initialization includes the use of a default value for power control factor α, which is broadcast, in a downlink frequency band, to the wireless terminals. Operation proceeds from start step 1302 to step 1304. In step 1304, the base station measures background interference, W, during a null interval, e.g., an uplink null interval in which WAN wireless terminals are controlled to refrain from signaling.

Operation proceeds from step 1304 to step 1306. In step 1306, the base station determines a power control factor α as a function of the measured background interference. In various embodiments, the function used is such that as W increases, α increases for at least some non-null range of W. In some embodiments, the determination of step 1306 includes a comparison with stored interference budget information. Operation proceeds from step 1306 to step 1308.

In step 1308, the base station broadcasts the determined power control factor α into a downlink frequency band. Operation proceeds from step 1308 to step 1304, where another measurement of background interference is performed.

In some embodiments, multiple measurements of background interference are performed and used corresponding to multiple null intervals in generating a determined power control factor which is broadcast. Thus in some embodiments, the base station performs a set of background measurements, e.g., multiple iterations of step 1304, corresponding to a set of null intervals before broadcasting a determined power control factor in step 1308.

Figure 19:
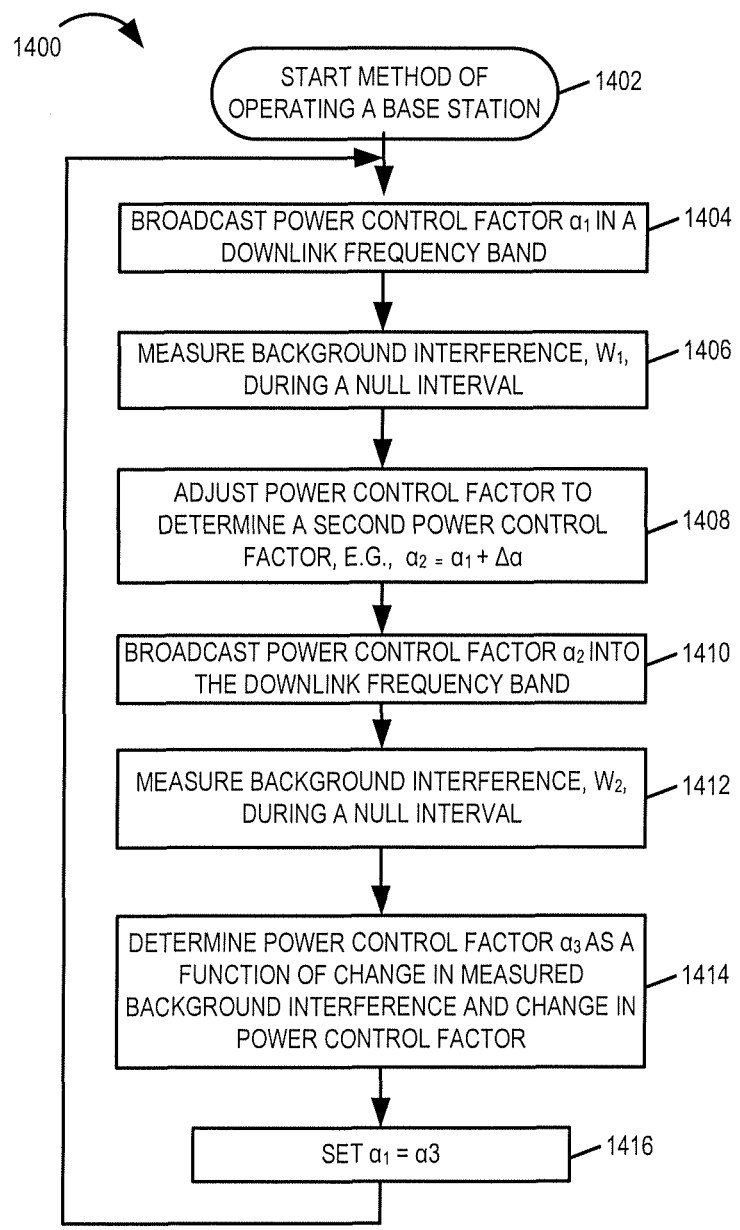
FIG. 19 is a flowchart of an exemplary method of operating a base station in accordance with various embodiments, e.g., a base station in which its uplink bandwidth is also utilized for peer to peer signaling.

FIG. 19 is a flowchart 1400 of an exemplary method of operating a base station in accordance with various embodiments, e.g., a base station in which its uplink bandwidth is also utilized for peer to peer signaling. The base station is, e.g., a base station, operating as part of a cellular communications system in which operations are not synchronized between adjacent base stations. In the uplink timing structure used by the base station uplink null periods are utilized by the base station to measure background interference. However, since operations in neighboring cells are not synchronized, the interference levels from the neighboring cells may vary over time making it more difficult to extract the peer to peer component of background interference, than would be the case if the adjacent base stations were synchronized and were also controlled to have intentional uplink nulls occurring concurrently. The base station desires to control interference, and determines and broadcasts a power control factor α, to be received by the wireless terminals in its vicinity. In accordance with a feature of this embodiment, the base station intentionally varies the broadcast power control factor which it broadcasts, as a controlled input, in order to measure response.

Operation starts in step 1402, where the base station is powered on and initialized, and proceeds to step 1404. In step 1404, the base station broadcasts a power control factor $\alpha_1$ into a downlink frequency band. At this point $\alpha_1$ is a default value obtained from initialization. Then, in step 1406, the base station measures background interference $W_1$ during a null interval, e.g., an uplink WAN null interval in which wireless communications devices using the base station are intentionally restricted from transmitting uplink signals. Operation proceeds from step 1406 to step 1408.

In step 1408, the base station adjusts the power control factor to determine a second power control factor $\alpha_2$. For example, $\alpha_2 = \alpha_1 + \Delta\alpha$, where $\Delta\alpha$ is a non-zero value and can be positive or negative. Typically $\Delta\alpha$ has a magnitude which is a small fraction of the magnitude of $\alpha_1$, e.g., less than or equal to 25% of $\alpha_1$. Operation proceeds from step 1408 to step 1410, in which the base station transmits the new power control factor $\alpha_2$ into the downlink frequency band. Operation proceeds from step 1410 to step 1412.

In step 1412, the base station measures background interference $W_2$ during a null interval. Operation proceeds from step 1412 to step 1414. In step 1414, the base station determines power control factor $\alpha_3$ as a function of the change in the measured background interference and the change in the power control factors which were transmitted. For example $\alpha_3$ is determined as a function of $\Delta W$ and $\Delta\alpha$, where $\Delta W = W_2 - W_1$. In one exemplary embodiment, $\alpha_3$ is one of: $\alpha_3 = \alpha_2 + \Delta\alpha$ and $\alpha_3 = \alpha_1 - \Delta\alpha$. Operation proceeds from step 1414 to step 1416, where the base station sets $\alpha_1 = \alpha_3$. Then operation proceeds to step 1404, where the base station broadcasts the power control factor $\alpha_1$ into the downlink frequency band.

Figure 20:
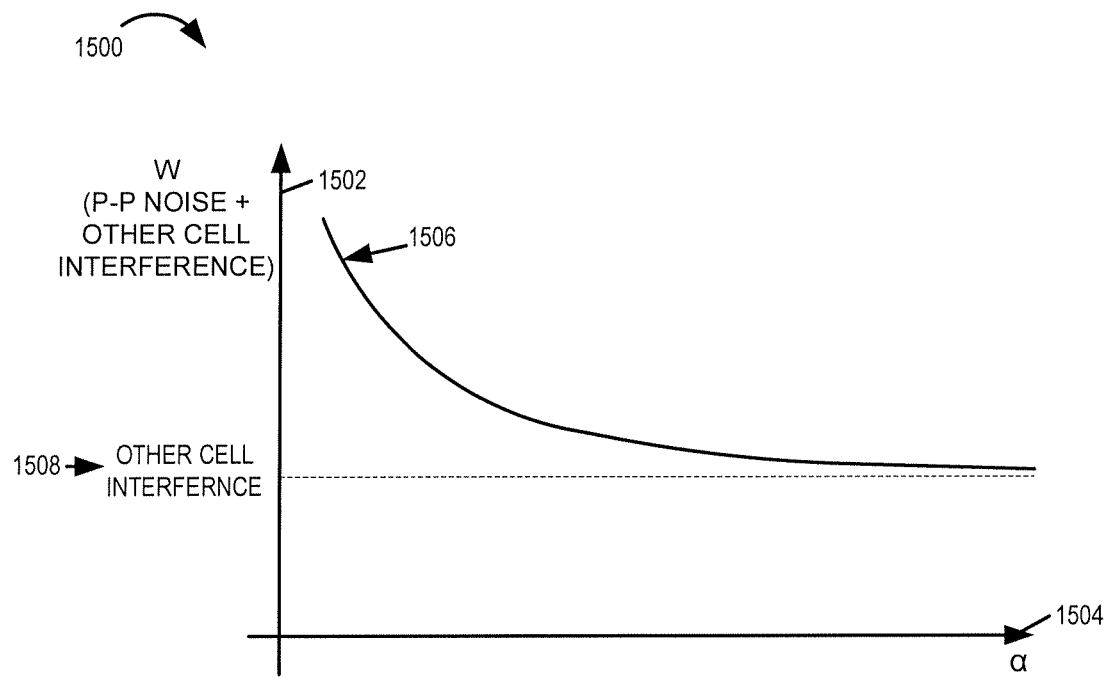
FIG. 20 is a drawing of a plot of noise W on the vertical axis vs control factor α on the horizontal axis.

FIG. 20 is a drawing of a plot 1500 of noise W on vertical axis 1502 vs α on horizontal axis 1504. Noise W, which represents receive noise at a base station attempting to recover uplink signals, includes peer to peer noise and other cell interference. The variable α is a power control factor. Curve 1506 is a characteristic curve of W vs α corresponding to other cell interference level 1508. During an intentional uplink null time interval corresponding to a first base station, the first base station intentionally controls wireless terminals using it as a point of network attachment to refrain from uplink signaling. During this intentional uplink null time interval, peer to peer activity within the cell is allowed to continue. Thus the peer to peer activity is treated by the first base station receiver as noise and contributes to the measured noise W.

Now consider that an adjacent base station is operating asynchronously with respect to the first base station. Since the adjacent base station is asynchronous with respect to the first base station, intentional uplink null time intervals of the adjacent base station do not necessary overlap intentional null time intervals of the first base station. Thus uplink signaling of the adjacent base station also contributes to the measured noise W measured by the first base station during intentional uplink null periods of the first base station.

Characteristic W vs α curve 1506 corresponds to a given level of other cell interference 1508, which represents a minimum level of interference. If operating on a point of the curve 1506 near saturation, then increases in α do not give significant improvement in reduction in noise W. An increase in α corresponds to a limiting of transmission power for peer to peer signaling. Thus, under such conditions, additionally restricting peer to peer transmission power levels does not significantly improve reception of the uplink signals from cellular wireless terminals. However, if operating on a point of curve 1506 having a high value for slope, a small increase in α can give a significant change decrease in the level of noise W. Under such conditions, at times, it may be beneficial to decrease α such as to improve recovery of the uplink signals from cell based wireless terminals. For example, a small throttling back of peer to peer transmission power levels, can, under such conditions, result in a significant improvement in uplink signaling recovery and/or throughput.

Figure 21:
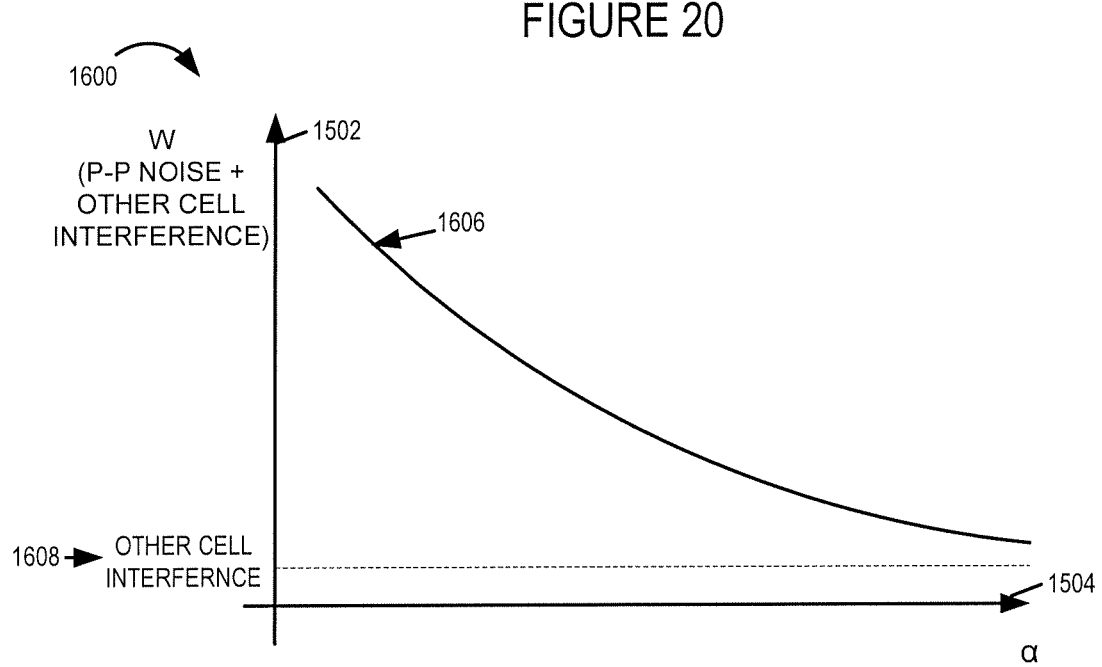
FIG. 21 is a drawing of a plot of noise W on the vertical axis vs control factor α on the horizontal axis, which illustrates a different level of other cell interference and a different characteristic curve as compared to FIG. 15.

In general, in various embodiments, good wide area, e.g., cellular, based communications reception is given priority over the peer to peer signaling. However, it is desirable that the peer to peer communications throughput be maximized given a particular level of desired cell based uplink reception quality. It may be observed that W vs α characteristic curve will change as a function of the other cell interference. The other cell interference may, and sometimes does, change independently of the first cell operation. For example, due to: conditions, the number of cellular based wireless terminal users in the adjacent cell, adjacent cell uplink traffic load, etc., the other cell interference experienced by the first base station may change to a different level. Plot 1600 of FIG. 21 illustrates a different level of other cell interference 1608 as compared to other cell interference level 1508 of FIG. 20. In addition FIG. 21 illustrates a different characteristic curve 1606 as compared to characteristic curve 1506.

Figure 22:
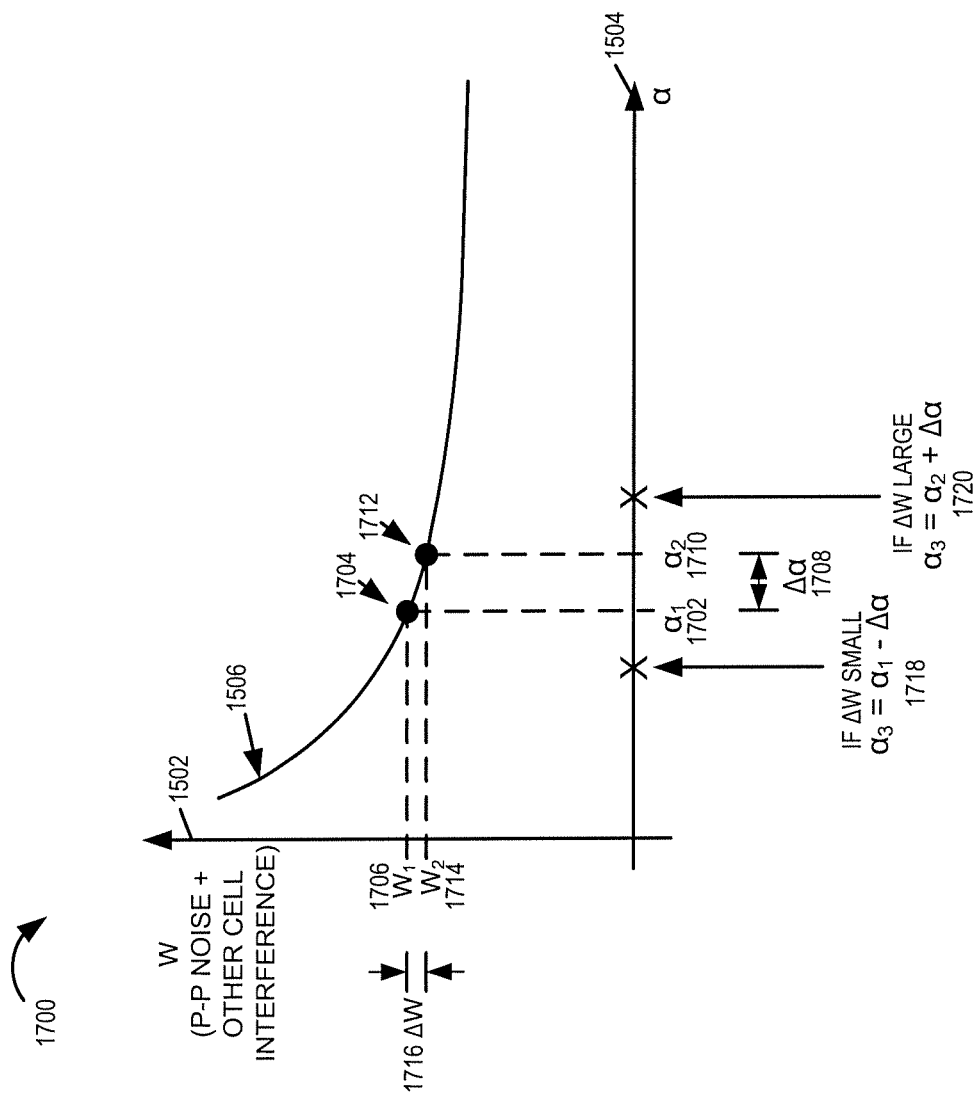
FIG. 22 illustrates an exemplary method of adjusting the selection of power control factor α used in various embodiments.

FIG. 22 illustrates an exemplary method of adjusting the selection of power control factor α used in various embodiments in response to noise measurements. FIG. 22 is a plot 1700 of noise W on vertical axis 1502 vs α on horizontal axis 1504 corresponding to characteristic curve 1506. At the time of operation, the first base station may be unaware that the first base station is operating on characteristic curve 1506 corresponding to other cell interference level 1508 of FIG. 20, with curve 1506 being one of a family of curves including curve 1506 and curve 1606 of FIG. 21.

The first base station sets α to an initial value α, 1702, which is broadcast into a downlink frequency band. The value $α_1$ 1702 is used by the peer to peer wireless terminals in the first base station's cell to control their peer to peer transmission power in a corresponding uplink frequency band. During an intentional uplink null period of the first base station, the first base station measures the receive noise level W as $W_1$ 1706. Then, the first base station intentionally changes the value of $α_1$ by an amount Δα 1708, to obtain $α_2$ 1710. This represents a controlled input used to intentionally drive the receive noise level to a different point (from 1704 to 1712) on the characteristic curve 1506. The first base station broadcasts the parameter $α_2$ 1710 into the downlink frequency band. The value $α_2$ 1710 is used by the peer to peer wireless terminals in the first base station's cell to control their peer to peer transmission power in the uplink frequency band. During an intentional uplink null period of the first base station, the first base station measures the receive noise level W as $W_2$ 1714. The first base station measures the change in W, ΔW 1716. The first base station then decides upon a new value for α as a function of the input driving value Δα 1708, the measured response ΔW 1716, and some stored interference budget information. In some embodiments, the first base station decides upon the new value for α as a function of at least one noise measurement point, e.g., $W_1$ or $W_2$. In this example, the first base station sets the new value for α, $α_3$ to $α_3=α_1-Δα$ if ΔW is small as indicated by point 1718; while, the first base station sets the new value for α, $α_3$ to $α_3=α_2+Δα$ if ΔW is large as indicated by point 1720, e.g., with the small and large determination being with respect to predetermined stored interference budget information. The power control factor $α_3$ is then broadcast into the downlink frequency band by the first base station to be used by the peer to peer wireless terminals in the cell to control their transmission power levels into the uplink frequency band.

FIG. 23 is a drawing 1800 illustrating exemplary bandwidth usage in some embodiments utilizing a time division duplex (TDD) for the wide area network, e.g., for the cellular communications. With respect to the wide area network, e.g., corresponding to a base station, the same frequency band is shared, e.g., in an alternating pattern between uplink and downlink. For example, the TDD band used for the wide area, e.g., cellular communications, is used for (uplink, downlink, uplink, downlink) as indicated by blocks (1804, 1806, 1808, 1810), respectively, along time line 1802. In addition to typical cellular based activities, the base station transmits a peer to peer reference and/or control broadcast signal(s), e.g., a beacon signal and/or other broadcast signals, during an interval typically reserved for wide area downlink signaling. This is represented by signals (1812, 1814) corresponding to time intervals for blocks (1806, 1810), respectively. In addition, time intervals designated to be used for wide area network, e.g., cellular uplink, are also used for peer to peer signaling, with the same TDD band being used, as indicated by cellular uplink blocks (1804, 1808) being concurrent with peer to peer blocks (1816, 1818), respectively.

FIG. 24 is a drawing 1900 illustrating exemplary bandwidth usage in some embodiments utilizing a frequency division duplex (FDD) for the wide area network, e.g., for the cellular communications. With respect to the wide area network, e.g., corresponding to a base station, different frequency bands are used by the uplink and downlink. In this exemplary embodiment, the FDD wide area uplink band is represented by block 1904 and the FDD wide area downlink band is represented by block 1906 along frequency axis 1902. In some embodiments, the uplink and downlink bands are adjacent. In some embodiments, the uplink and/or downlink bands include non-contiguous portions. In some embodiments, at least a portion of one of the uplink and downlink bands is included between two different portions of the other one of the uplink and downlink bands.

In addition to the typical cellular based uplink signaling in the FDD wide area uplink band, the band is used for other activities related to peer to peer signaling. In FIG. 24, the FDD wide area downlink band 1906 is also used by the base station to transmit peer-peer broadcast reference and/or control signal(s) 1908, e.g., a beacon signal and/or other broadcast signals are transmitted by the base station to be used by peer to peer wireless terminals. Peer to peer wireless terminals also use the same band for peer to peer signaling as indicated by block 1910 located on frequency axis 1902 corresponding to FDD wide area uplink band 1904.

FIG. 25 is a drawing 2100 illustrating exemplary frequency bands and shared frequency band usage between wide area network communications usage and peer to peer communications usage in accordance with various embodiments. A band used as a wide area network communications band is also allocated for usage as a peer to peer TDD receiver band and as a peer to peer TDD transmitter band. As an example, the bands presented in FIG. 25 may be utilized by a multi-mode wireless communications device, e.g., with a different pair of WAN uplink and downlink communications bands being available and/or used at different locations and/or at different times.

Horizontal axis 2101 represents frequency. Corresponding to frequency $f_{UL1}$ 2103 there is a wide area network uplink frequency division duplex band 2102, a peer to peer time division duplex transmit band 2106 and a peer to peer time division duplex receive band 2108. Wide area network uplink frequency division duplex band 2102 is paired with wide area network downlink frequency division duplex band 2104. Corresponding to frequency $f_{DL1}$ 2105 there is wide area network downlink frequency division duplex band 2104. The WAN downlink FDD band 2104 is also used as a band 2109 for communicating a base station sourced broadcast signal such as a beacon signal or a non-beacon control channel signal, e.g., for communicating a reference and/or control information signal used to influence peer to peer signaling, e.g., used for peer to peer transmission power control.

Similarly, corresponding to frequency $f_{UL2}$ 2113 there is a wide area network uplink frequency division duplex band 2112, a peer to peer time division duplex transmit band 2116 and a peer to peer time division duplex receive band 2118. Wide area network uplink frequency division duplex band 2112 is paired with wide area network downlink frequency division duplex band 2114. Corresponding to frequency $f_{DL2}$ 2115 there is wide area network downlink frequency division duplex band 2114. The WAN downlink FDD band 2114 is also used as a band 2119 for communicating a base station sourced broadcast signal such as a beacon signal or a non-beacon control channel signal, e.g., for communicating a reference and/or control information signal used to influence peer to peer signaling, e.g., used for peer to peer transmission power control.

Similarly, corresponding to frequency $f_{UL3}$ 2123 there is a wide area network uplink frequency division duplex band 2122, a peer to peer time division duplex transmit band 2126 and a peer to peer time division duplex receive band 2128. Wide area network uplink frequency division duplex band 2122 is paired with wide area network downlink frequency division duplex band 2124. Corresponding to frequency $f_{DL3}$ 2125 there is wide area network downlink frequency division duplex band 2124. The WAN downlink FDD band 2124 is also used as a band 2129 for communicating a base station sourced broadcast signal such as a beacon signal or a non-beacon control channel signal, e.g., for communicating a reference and/or control information signal used to influence peer to peer signaling, e.g., used for peer to peer transmission power control.

In some embodiments, a cellular based communications system using at least one of TDD and FDD accommodates peer to peer signaling with at least some of the peer to peer signaling sharing air link resources also used for uplink wide area network, e.g., cell based, uplink signaling. In some embodiments, a typical cellular based communications system using at least one of TDD and FDD is modified to accommodate peer to peer signaling with at least some of the peer to peer signaling sharing air link resources typically reserved for uplink wide area network, e.g., cell based, uplink signaling. In some embodiments, many legacy communications devices supporting cell based signaling, but not peer to peer signaling, can continue to be used in the communications system. In various embodiments, a communications system supports a mixture of communications devices with at least some of the communications devices supporting peer to peer communications, but not supporting cell based communications. In some embodiments, a communications system supports a mixture of communications devices with at least some of the communications devices supporting both peer to peer communications and cell based communications.

While described primarily in the context of an OFDM system, the methods and apparatus of various embodiments are applicable to a wide range of communications systems including many non-OFDM and/or non-cellular systems. Some exemplary systems include a mixture of technologies utilized in the peer to peer signaling, e.g., some OFDM type signals and some CDMA type signals.

In various embodiments nodes described herein are implemented using one or more modules to perform the steps corresponding to one or more methods, for example, scanning an uplink bandwidth, evaluating a base station signal, determining a transmission power level control parameter, controlling peer to peer transmission power, measuring interference, determining a transmission power control value, transmitting a transmission power control parameter etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating a wireless communications device supporting peer to peer communications in a base station uplink frequency band, the method comprising:

receiving a first signal from a base station in a downlink frequency band;

performing an evaluation on the received signal to obtain information through both measuring a signal power of the first received signal and extracting encoded information conveyed in the first received signal wherein the transmission level of the first signal or the encoded information is varied by the base station to dynamically regulate interference to the base station uplink frequency band generated by a plurality of peer to peer wireless terminals; and controlling peer to peer transmission power for at least some peer to peer signal transmissions in said uplink frequency band as a function of the result of the evaluation of said first received signal, wherein controlling peer to peer transmission power includes using a first function that limits peer to peer transmission power to a lower level for a first received signal power level than for a second received signal power level which is higher than said first received signal power level.

2. The method of claim 1, further comprising:

receiving a second signal from said base station in said downlink frequency band at a time which is different from the time at which said first signal is received;

performing an evaluation on the second received signal; and determining from the evaluation of the second received signal that said wireless communications device should refrain from transmitting peer to peer communications signals in said uplink frequency band.

3. The method of claim 2 further comprising:

refraining from transmitting peer to peer communications signals in said uplink frequency band after determining that the communications device should refrain from transmitting peer to peer communications signals until determining from evaluating another signal from said base station that said wireless communications device is permitted to transmit peer to peer signals.

4. The method of claim 1, wherein said first signal is a beacon signal.

5. The method of claim 4, wherein said beacon signal includes at most three OFDM tones, and wherein tones of the beacon signal have a per tone transmission power level that is at least 10 dBs higher than the average per tone transmission power level of a non-null tone of a peer to peer signal.

6. The method of claim 1, wherein said first signal is a broadcast channel signal.

7. The method of claim 6, wherein said broadcast channel signal includes a set of OFDM tones, and wherein tones of the broadcast channel signal have a per tone transmission power level that is at least 3 dBs higher than the average per tone transmission power level of a non-null tone of a peer to peer signal.

8. The method of claim 1, wherein said first signal is a CDMA pilot signal.

9. The method of claim 1 wherein said uplink and downlink frequency bands correspond to different non-overlapping frequency division duplex (FDD) WAN base station communications bands.

10. The method of claim 1, wherein said uplink frequency band corresponds to a base station time division duplex (TDD) band during uplink time slots and wherein said downlink frequency band corresponds to the same base station TDD band during downlink time slots.

11. The method of claim 1, wherein said first function determines a maximum permitted peer to peer transmission power level.

12. An apparatus comprising:
a processor for use in a wireless communications device supporting peer to peer communications in a base station uplink frequency band, the processor configured to:
receive a first signal from a base station in a downlink frequency band;
perform an evaluation on the received signal to obtain information through both measuring a signal power of the first received signal and extracting encoded information conveyed in the first received signal wherein the transmission level of the first signal or the encoded information is varied by the base station to dynamically regulate interference to the base station uplink frequency band generated by a plurality of peer to peer wireless terminals; and
control peer to peer transmission power for at least some peer to peer signal transmissions in said uplink frequency band as a function of the result of the evaluation of said first received signal,
wherein the peer to peer transmission power is controlled using a first function that limits peer to peer transmission power to a lower level for a first received signal power level than for a second received signal power level which is higher than said first received signal power level.

13. The apparatus of claim 12, wherein said processor is further configured to:
receive a second signal from said base station in said downlink frequency band at a time which is different from the time at which said first signal is received;
perform an evaluation on the second received signal; and
determine from the evaluation of the second received signal that said wireless communications device should refrain from transmitting peer to peer communications signals in said uplink frequency band.

14. The apparatus of claim 13, wherein said processor is further configured to:
control the communications device to refrain from transmitting peer to peer communications signals in said uplink frequency band after determining that the communications device should refrain from transmitting peer to peer communications signals until determining from evaluating another signal from said base station that said wireless communications device is permitted to transmit peer to peer signals.

15. A non-transitory machine readable medium embodying machine executable instructions for controlling a wireless communications device supporting peer to peer communications in a base station uplink frequency band to implement a method of communicating with another communications device, the method comprising:
receiving a first signal from a base station in a downlink frequency band;
performing an evaluation on the received signal to obtain information through both measuring a signal power of the first received signal and extracting encoded information conveyed in the first received signal wherein the transmission level of the first signal or the encoded information is varied by the base station to dynamically regulate interference to the base station uplink frequency band generated by a plurality of peer to peer wireless terminals; and
controlling peer to peer transmission power for at least some peer to peer signal transmissions in said uplink frequency band as a function of the result of the evaluation of said first received signal,
wherein controlling peer to peer transmission power includes using a first function that limits peer to peer transmission power to a lower level for a first received signal power level than for a second received signal power level which is higher than said first received signal power level.

16. The non-transitory machine readable medium of claim 15, further embodying machine executable instructions for:
receiving a second signal from said base station in said downlink frequency band at a time which is different from the time at which said first signal is received;
performing an evaluation on the second received signal; and
determining from the evaluation of the second received signal that said wireless communications device should refrain from transmitting peer to peer communications signals in said uplink frequency band.

17. The non-transitory machine readable medium of claim 16, further embodying machine executable instructions for:
refraining from transmitting peer to peer communications signals in said uplink frequency band after determining that the communications device should refrain from transmitting peer to peer communications signals until determining from evaluating another signal from said base station that said wireless communications device is permitted to transmit peer to peer signals.

18. A wireless communications device supporting peer to peer communications in a base station uplink frequency band, the wireless communications device comprising:
a receiver module for receiving a first signal from a base station in a downlink frequency band;
a signal processing module for performing an evaluation on the received signal to obtain information, the signal processing module comprising a power measurement module for measuring a signal power of the first received signal and a decoder module for extracting encoded information conveyed in the first received signal, the obtained information comprising both the signal power measurement and the extracted encoded information signal wherein the transmission level of the first signal or the encoded information is varied by the base station to dynamically regulate interference to the base station uplink frequency band generated by a plurality of peer to peer wireless terminals; and a peer to peer transmission power control module for controlling peer to peer transmission power for at least some peer to peer signal transmissions in said uplink frequency band as a function of the result of the evaluation of said first received signal, wherein said peer to peer transmission power control module controls peer to peer transmission power using a first function that limits peer to peer transmission power to a lower level for a first received signal power level than for a second received signal power level which is higher than said first received signal power level.

19. The wireless communications device of claim 18, further comprising:

a peer to peer authorization module for determining from the evaluation of the received signal whether the wireless communications device is permitted to transmit peer to peer communications signals in said uplink frequency band or whether the wireless terminal is restricted from transmitting peer to peer communications signals in said uplink frequency band.

20. The wireless communications device of claim 18, wherein said first signal is a beacon signal.

21. The wireless communications device of claim 20, wherein said beacon signal includes at most three OFDM tones, and wherein tones of the beacon signal have a per tone transmission power level that is at least 10 dBs higher than the average per tone transmission power level of a non-null tone of a peer to peer signal, the apparatus further comprising:

a memory including stored information characterizing a base station sourced beacon signal which is used for peer to peer transmission power control; and a peer to peer transmission power control beacon identification module for identifying said beacon signal.

22. The wireless communications device of claim 18, wherein said first signal is a broadcast channel signal.

23. The wireless communications device of claim 22, wherein said broadcast channel signal includes a set of OFDM tones, and wherein tones of the broadcast channel signal have a per tone transmission power level that is at least 3 dBs higher than the average per tone transmission power level of a non-null tone of a peer to peer signal, the wireless communications device further comprising:

a memory including stored information characterizing a base station sourced broadcast channel signal used for peer to peer transmission power control; and a peer to peer transmission power control broadcast identification module for identifying said broadcast channel signal.

24. The wireless communications device of claim 18, wherein said first signal is a CDMA pilot signal.

25. The wireless communications device of claim 18 wherein said uplink and downlink frequency bands correspond to different non-overlapping frequency division duplex (FDD) WAN base station communications bands, the wireless communications device further comprising:

a memory including stored FDD air link resource structure information.

26. The wireless communications device of claim 18, wherein said uplink frequency band corresponds to a base station time division duplex (TDD) band during uplink time slots and wherein said downlink frequency band corresponds to the same base station TDD band during downlink time slots, the wireless communications device further comprising:

a memory included stored TDD air link resource structure information.

27. The wireless communications device of claim 18, wherein said first function determines a maximum permitted peer to peer transmission power level.

28. A wireless communications device supporting peer to peer communications in a base station uplink frequency band, the wireless communications device comprising:

receiver means for receiving a first signal from a base station in a downlink frequency band;

means for performing an evaluation on the received signal to obtain information, the means for performing the evaluation comprising means for measuring a power level of the first received signal and means for extracting encoded information conveyed in the first received signal, the obtained information comprising the measured power level and the extracted encoded information signal wherein the transmission level of the first signal or the encoded information is varied by the base station to dynamically regulate interference to the base station uplink frequency band generated by a plurality of peer to peer wireless terminals; and means for controlling peer to peer transmission power for at least some peer to peer signal transmissions in said uplink frequency band as a function of the result of the evaluation of said first received signal, wherein said means for controlling controls peer to peer transmission power using a first function which limits peer to peer transmission power to a lower level for a first received signal power level than for a second received signal power level which is hi her than said first received signal power level.

29. The wireless communications device of claim 28, further comprising:

means for determining from the evaluation of the received signal whether the wireless communications device is permitted to transmit peer to peer communications signals in said uplink frequency band or whether the wireless terminal is restricted from transmitting peer to peer communications signals in said uplink frequency band.

* * * * *